(12) United States Patent
Rossi et al.

(10) Patent No.: US 12,175,366 B2
(45) Date of Patent: Dec. 24, 2024

(54) GRAPH NEURAL NETWORKS FOR DATASETS WITH HETEROPHILY

(71) Applicant: Adobe Inc., San Jose, CA (US)

(72) Inventors: Ryan Rossi, Santa Clara, CA (US); Tung Mai, San Jose, CA (US); Nedim Lipka, Campbell, CA (US); Jiong Zhu, Ann Arbor, MI (US); Anup Rao, San Jose, CA (US); Viswanathan Swaminathan, Saratoga, CA (US)

(73) Assignee: Adobe Inc., San Jose, CA (US)

( * ) Notice: Subject to any disclaimer, the term of this patent is extended or adjusted under 35 U.S.C. 154(b) by 947 days.

(21) Appl. No.: 17/210,157

(22) Filed: Mar. 23, 2021

(65) Prior Publication Data

US 2022/0309334 A1    Sep. 29, 2022

(51) Int. Cl.
  *G06N 3/08* (2023.01)
  *G06F 16/901* (2019.01)
  *G06F 18/2132* (2023.01)
  *G06F 18/2413* (2023.01)
  *G06N 5/02* (2023.01)

(52) U.S. Cl.
  CPC ........... *G06N 3/08* (2013.01); *G06F 16/9024* (2019.01); *G06F 18/21322* (2023.01); *G06F 18/24147* (2023.01); *G06N 5/02* (2013.01)

(58) Field of Classification Search
  CPC .............................. G06N 3/08; G06F 7/4876
  USPC .................................................. 706/25; 705/2
  See application file for complete search history.

(56) References Cited

U.S. PATENT DOCUMENTS

| | | | |
|---|---|---|---|
| 10,965,806 B1 * | 3/2021 | Haggerty | H04L 65/1083 |
| 2021/0034994 A1 * | 2/2021 | Stocker | G06N 5/04 |
| 2021/0049441 A1 * | 2/2021 | Bronstein | G06F 17/11 |

(Continued)

FOREIGN PATENT DOCUMENTS

WO    WO-2022115704 A1 *    6/2022    ........... G06F 7/4876

OTHER PUBLICATIONS

ABU-EL-HAIJA et al., MixHop: Higher-Order Graph Convolution Architectures via Sparsified Neighborhood Mixing, Proceedings of the 36th International Conference on Machine Learning, In International Conference on Machine Learning (ICML), 2019, 9 pages.

(Continued)

*Primary Examiner* — Ruay Ho
(74) *Attorney, Agent, or Firm* — Kilpatrick Townsend & Stockton LLP

(57) ABSTRACT

Techniques are provided for training graph neural networks with heterophily datasets and generating predictions for such datasets with heterophily. A computing device receives a dataset including a graph data structure and processes the dataset using a graph neural network. The graph neural network defines prior belief vectors respectively corresponding to nodes of the graph data structure, executes a compatibility-guided propagation from the set of prior belief vectors and using a compatibility matrix. The graph neural network predicts predicting a class label for a node of the graph data structure based on the compatibility-guided propagations and a characteristic of at least one node within a neighborhood of the node. The computing device outputs the graph data structure where it is usable by a software tool for modifying an operation of a computing environment.

18 Claims, 12 Drawing Sheets

(56) References Cited

U.S. PATENT DOCUMENTS

| | | | |
|---|---|---|---|
| 2022/0004875 A1* | 1/2022 | Koike-Akino | G06N 3/045 |
| 2022/0126445 A1* | 4/2022 | Zhu | B25J 9/1635 |
| 2023/0004875 A1* | 1/2023 | Wang | G06Q 10/02 |
| 2023/0113811 A1* | 4/2023 | Wang | G06V 10/82 705/2 |

OTHER PUBLICATIONS

Ahmed et al., Learning Role-Based Graph Embeddings, In IJCAI, Jul. 2, 2018, 8 pages.

Barabasi et al., Emergence of Scaling In Random Networks, Science, vol. 286, No. 5439, Oct. 15, 1999, pp. 509-512.

Defferrard et al., Convolutional Neural Networks on Graphs with Fast Localized Spectral Filtering, In Advances in Neural Information Processing Systems, 2016, pp. 3844-3852.

Fout et al., Protein Interface Prediction Using Graph Convolutional Networks, In Advances in Neural Information Processing Systems, 2017, pp. 6530-6539.

Gatterbauer et al., Linearized and Single-Pass Belief Propagation, Proceedings of the VLDB Endowment, vol. 8, No. 5, 2015, pp. 581-592.

Hamilton, Reference PyTorch GraphSAGE Implementation, Available Online at: https://github.com/williamleif/graphsage-simple, 2017, 2 pages.

Hamilton et al., Inductive Representation Learning on Large Graphs, In 31st Conference on Neural Information Processing Systems (NIPS), 2017, 11 pages.

Hou et al., Measuring and Improving the Use of Graph Information in Graph Neural Networks, In International Conference on Learning Representations, 2020, pp. 1-16.

Hu et al., Open Graph Benchmark: Datasets for Machine Learning on Graphs, Available Online at: arXivpreprintarXiv:2005.00687, Feb. 25, 2021, pp. 1-34.

Karimi et al., Visibility of Minorities in Social Networks, Available Online at: arXiv preprint arXiv:1702.00150, Feb. 1, 2017, pp. 1-11.

Kipf et al., Semi-Supervised Classification with Graph Convolutional Networks, Available Online at: arXiv preprint arXiv:1609.02907, Feb. 22, 2017, pp. 1-14.

Klicpera et al., Diffusion Improves Graph Learning, In Conference on Neural Information Processing Systems (NeurIPS), Dec. 29, 2019, 22 pages.

Koutra et al., Unifying Guilt-By-Association Approaches: Theorems and Fast Algorithms, In Joint European Conference on Machine Learning and Knowledge Discovery in Databases, 2011, pp. 245-260.

London et al., Data Classification: Algorithms and Applications 399, Collective Classification of Network Data, 2014, p. 399 (1-3 pages provided).

Lu et al., Link-Based Classification, In Proceedings of the Twentieth International Conference on International Conference on Machine Learning (Icml), AAAI Press, 2003, pp. 496-503.

Mcdowell et al., Cautious Inference in Collective Classification, In Association for the Advancement of Artificial Intelligence (AAAI), vol. 7, 2007, pp. 596-601.

Mcpherson et al., Birds of a Feather: Homophily in Social Networks, Annual Review of Sociology, vol. 27, No. 1, 2001, pp. 415-444.

Neville et al., Iterative Classification in Relational Data, Proceedings of the AAAI 2000 Workshop Learning Statistical Models from Relational Data, AAAI Press, 2000, pp. 13-20.

Pandit et al., NetProbe: A Fast and Scalable System for Fraud Detection in Online Auction Networks, In Proceedings of the 16th International Conference on World Wide Web, 2007, 11 pages.

Pei et al., Geom-GCN: Geometric Graph Convolutional Networks, In International Conference on Learning Representations, Feb. 14, 2020, pp. 1-12.

Qu et al., GMNN: Graph Markov Neural Networks, In International Conference on Machine Learning, 2019, pp. 5241-5250.

Rossi et al., From Community to Role-Based Graph Embeddings, Available Online at: https://arxiv.org/pdf/1908.08572v1.pdf, pp. 1-31, Aug. 22, 2019.

Rossi et al., On Proximity and Structural Role-Based Embeddings in Networks: Misconceptions, Techniques, and Applications, In Transactions on Knowledge Discovery from Data (TKDD), vol. 14, No. 5, Aug. 2020, 37 pages.

Rossi et al., Relational Similarity Machines (RSM): A Similarity-Based Learning Framework for Graphs, In IEEE BigData, vol. 10, 2018, 10 pages.

Rossi et al., The Network Data Repository with Interactive Graph Analytics and Visualization, In Association for the Advancement of Artificial Intelligence (AAAI), Available Online at: https://networkrepository.com/pubs/aaai15-nr.pdf, 2015, pp. 4292-4293.

Rossi et al., Transforming Graph Data for Statistical Relational Learning, Journal of Artificial Intelligence Research (JAIR), vol. 45, 2012, pp. 363-441.

Rozemberczki, Multiscale Attributed Node Embedding, Available Online at: https://www.researchgate.net/publication/336147076_Multi-scale_Attributed_Node_Embedding, Sep. 28, 2019, 20 pages.

Scarselli et al., The Graph Neural Network Model, IEEE Transactions on Neural Networks, vol. 20, No. 1, 2009, pp. 61-80.

Sen et al., Collective Classification in Network Data, AI Magazine, vol. 29, No. 3, 2008, pp. 93-106.

Sinkhorn et al., Concerning Non-Negative Matrices and Doubly Stochastic Matrices, Pacific Journal of Mathematics, vol. 21, No. 2, 1967, pp. 343-348.

Stretcu et al., Graph Agreement Models for Semi-Supervised Learning, Advances in Neural Information Processing Systems, vol. 32, 2019, pp. 8713-8723.

Thekumparampil et al., Attention-Based Graph Neural Network for Semi-Supervised Learning, Available Online at: https://arxiv.org/pdf/1803.03735.pdf, 2018, pp. 1-15.

Velickovic et al., Graph Attention Networks, Available Online at: arXiv preprint arXiv:1710.10903, Feb. 4, 2018, pp. 1-12.

Wu et al., Simplifying Graph Convolutional Networks, Available Online at: arXiv preprint arXiv:1902.07153, Jun. 20, 2019, 14 pages.

Xu et al., How Powerful are Graph Neural Networks, Available Online at: arXiv preprint arXiv:1810.00826, Feb. 22, 2019, pp. 1-17.

Yan et al., Groupinn: Grouping-Based Interpretable Neural Network for Classification of Limited, Noisy Brain Data, In Proceedings of the 25th Acm Sigkdd International Conference on Knowledge Discovery & Data Mining, 2019, pp. 772-782.

Yang et al., Revisiting Semi-Supervised Learning with Graph Embeddings, In International Conference on Machine Learning, May 26, 2016, pp. 40-48.

Yedidia et al., Understanding Belief Propagation and Its Generalizations, Exploring Artificial Intelligence in the New Millennium, vol. 8, 2003, pp. 236-239.

Ying et al., Graph Convolutional Neural Networks for Web-Scale Recommender Systems, In Proceedings of the 24th ACM SIGKDD International Conference on Knowledge Discovery & Data Mining, 2018, pp. 974-983.

Zitnik et al., Modeling Polypharmacy Side Effects with Graph Convolutional Networks, Bioinformatics, vol. 34, No. 13, 2018, pp. i457-i466.

\* cited by examiner

Table 1: Accuracy on Heterophily with features

| Hom. ratio h | Texas 0.11 | Squirrel 0.22 | Chameleon 0.23 |
|---|---|---|---|
| CPGNN-MLP-1 | 63.68±5.32 | 32.70±1.90 | 51.33±1.52 |
| CPGNN-MLP-2 | 69.65±3.48 | 27.10±1.31 | 54.12±2.25 |
| CPGNN-Cheby-1 | 63.13±5.72 | 32.03±1.23 | 53.90±2.61 |
| CPGNN-Cheby-2 | 63.96±4.36 | 28.49±1.17 | 53.68±3.40 |
| GraphSAGE | 67.36±3.05 | 34.35±1.09 | 45.45±1.97 |
| GCN-Cheby | 58.96±3.04 | 26.52±0.92 | 36.66±1.84 |
| MixHop | 62.15±2.48 | 36.42±3.43 | 46.84±3.47 |
| GCN | 55.90±2.05 | 33.31±0.89 | 52.00±2.30 |
| GAT | 55.83±0.67 | 31.20±2.57 | 50.54±1.97 |
| MLP | 64.65±3.06 | 25.50±0.87 | 37.36±2.05 |

Table 2: Accuracy on Homophily graphs with features

| Hom. ratio h | Citeseer 0.74 | Pubmed 0.80 | Cora 0.81 |
|---|---|---|---|
| CPGNN-MLP-1 | 71.22±1.40 | 86.57±0.34 | 77.40±1.10 |
| CPGNN-MLP-2 | 72.04±1.14 | 84.57±0.48 | 81.49±1.25 |
| CPGNN-Cheby-1 | 72.04±0.53 | 86.68±0.20 | 83.64±1.31 |
| CPGNN-Cheby-2 | 72.06±0.52 | 86.68±0.26 | 81.41±1.34 |
| GraphSAGE | 71.74±0.66 | 85.66±0.53 | 81.60±1.16 |
| GCN-Cheby | 72.04±0.58 | 86.43±0.31 | 83.29±1.20 |
| MixHop | 73.23±0.60 | 85.12±0.29 | 85.34±1.23 |
| GCN | 72.27±0.52 | 86.42±0.27 | 83.56±1.21 |
| GAT | 72.63±0.87 | 84.48±0.22 | 79.57±2.12 |
| MLP | 66.52±0.99 | 84.70±0.33 | 64.81±1.20 |

| Table 3: Accuracy on Heterophily Graphs Without Features | | | |
|---|---|---|---|
| Hom. ratio h | Texas 0.11 | Squirrel 0.22 | Chameleon 0.23 |
| CPGNN-MLP-1 | 64.05±7.65 | 54.62±2.11 | 68.79±2.45 |
| CPGNN-MLP-2 | 68.11±8.43 | 36.46±1.79 | 71.91±2.28 |
| CPGNN-Cheby-1 | 61.62±10.26 | 55.42±2.20 | 67.81±2.03 |
| CPGNN-Cheby-2 | 68.11±7.07 | 27.72±1.96 | 65.11±3.29 |
| GraphSAGE | 65.14±6.55 | 36.76±2.23 | 56.75±1.69 |
| GCN-Cheby | 50.00±8.08 | 12.63±0.71 | 14.93±1.53 |
| MixHop | 57.30±5.06 | 32.58±4.65 | 51.86±2.19 |
| GCN | 51.08±7.48 | 43.77±1.32 | 61.89±2.24 |
| GAT | 57.03±4.31 | 43.27±2.06 | 59.96±2.7 |
| MLP | 44.86±9.29 | 20.19±1.36 | 19.89±1.56 |

1208

| Table 4: Accuracy on Homophily Graphs Without Features | | | |
|---|---|---|---|
| Hom. ratio h | Citeseer 0.74 | Pubmed 0.80 | Cora 0.81 |
| CPGNN-MLP-1 | 65.84±2.93 | 81.82±0.36 | 81.79±1.35 |
| CPGNN-MLP-2 | 68.37±3.49 | 81.20±0.55 | 82.27±1.69 |
| CPGNN-Cheby-1 | 67.89±2.82 | 82.33±0.46 | 83.90±1.37 |
| CPGNN-Cheby-2 | 67.38±1.92 | 80.62±0.62 | 81.01±1.54 |
| GraphSAGE | 66.06±3.30 | 78.07±3.98 | 81.57±2.16 |
| GCN-Cheby | 67.47±3.00 | 79.33±0.53 | 84.00±1.24 |
| MixHop | 68.31±3.24 | 82.97±0.41 | 85.07±1.22 |
| GCN | 67.02±2.97 | 82.44±0.42 | 83.12±1.59 |
| GAT | 68.22±3.12 | 81.99±0.52 | 81.41±2.09 |
| MLP | 17.85±1.37 | 38.54±0.96 | 20.66±1.42 |

*FIG. 12*

GRAPH NEURAL NETWORKS FOR DATASETS WITH HETEROPHILY

TECHNICAL FIELD

This disclosure relates generally to graph neural networks. More specifically, but not by way of limitation, this disclosure relates to graph neural networks for learning from heterophily datasets and generating predictions for such datasets with heterophily.

BACKGROUND

Graph neural networks (GNNs) model datasets using nodes that are interconnected by edges. The datasets may be processed by the GNNs to derive predictions associated with the datasets (e.g., such as a feature, a class label, a type, etc.). Generally, existing GNNs include an implicit assumption of strong homophily (e.g., an indication that datasets are related or have common features). For example, existing GNNs assume that nodes of the graph neural network connected by an edge are related by, for example, having a same attribute value, type, class label, or the like. These GNNs may perform well (e.g., according to mean absolute error, root mean squared error, percent correct classification, or the like) when the datasets processed by the GNNS include strong homophily. Yet, such strong homophily is rarely observed in real-world data such as customer profile data or heterogeneous graph data. In real-world datasets, nodes often connect to nodes having different attribute values, different types, different class, etc. Thus, existing GNNs do not perform well using real-world datasets.

SUMMARY

Certain embodiments involve raining graph neural networks with heterophily datasets and generating predictions for such datasets with heterophily. For example, a computing device receives a dataset that includes a graph data structure. The computing device processes, the dataset with a graph neural network. The graph neural network defines a set of prior belief vectors respectively corresponding to nodes of the graph data structure. The graph neural network executes a compatibility-guided propagation from the set of prior belief vectors using a compatibility matrix. The compatibility matrix models a probability of nodes of different classes being connected. The graph neural network predicts a class label for a node of the graph data structure based on the compatibility-guided propagations and a characteristic of at least one node within a neighborhood of the node. The graph neural network, then applies the class label to the node. The computing device outputs the graph data structure processed by the graph neural network. The graph data structure as processes is usable by a software tool for modifying an operation of a computing environment.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 11 depicts example evaluation of the accuracy of a CPGNN on homophily and heterophily graphs with features in accordance with certain embodiments described in the present disclosure.

FIG. 12 depicts example evaluation of the accuracy of a CPGNN on homophily and heterophily graphs without features in accordance with certain embodiments described in the present disclosure.

DETAILED DESCRIPTION

Figure 1:
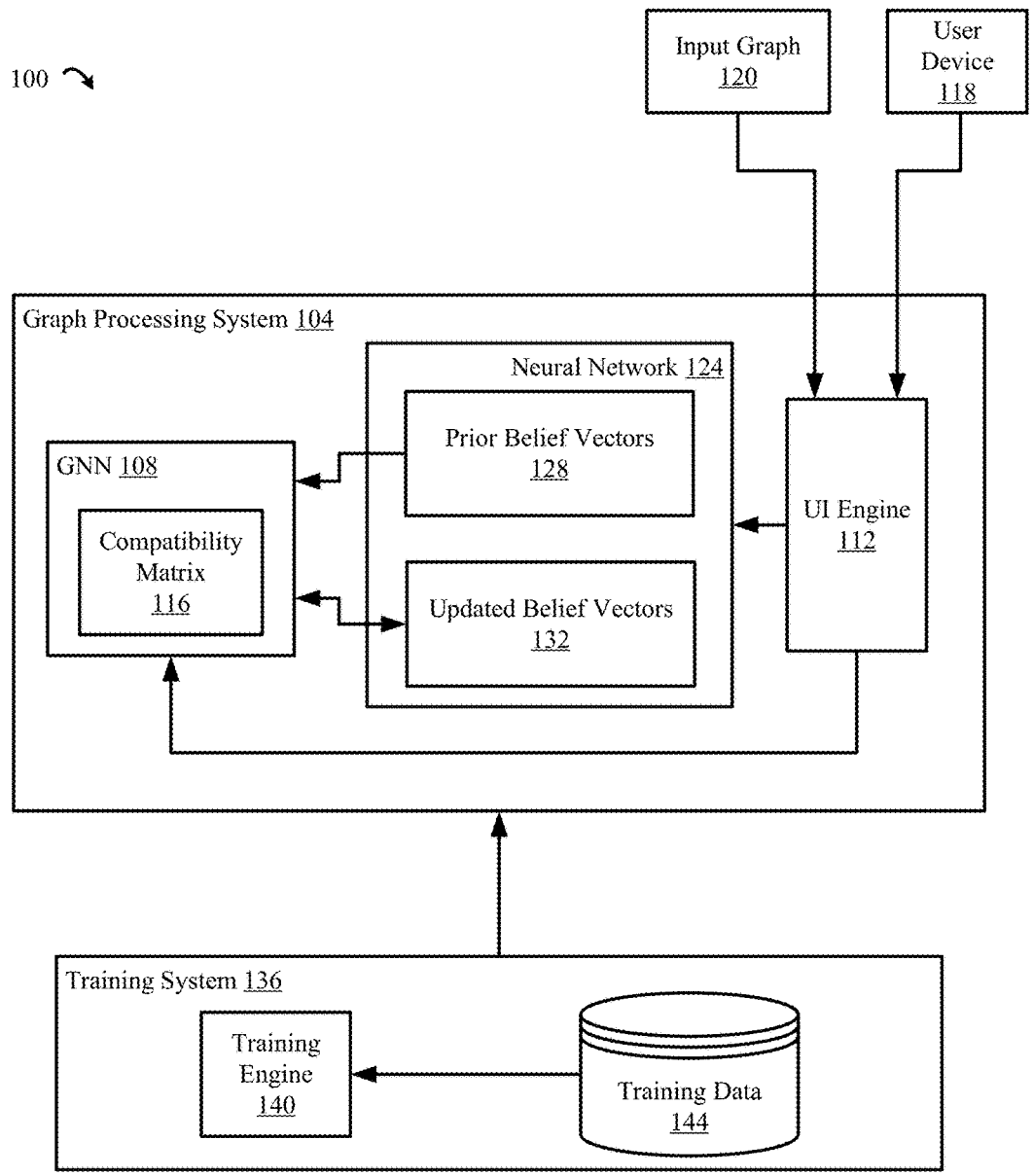
FIG. 1 depicts an example of a computing environment for configuring and using a CPGNN that determines class labels for nodes of input graphs, in accordance with certain embodiments described in the present disclosure.

The present disclosure includes systems and methods for generating and training graph neural networks for predicting characteristics using datasets with heterophily. As explained above, existing graph neural networks that model datasets and predicting characteristics of those datasets are limited by assuming homophily in the datasets, which thereby results in graph neural networks with reduced performance. Certain embodiments described herein improve graph neural networks by, for example, incorporating compatibility matrices for compatibility-guided propagation of nodes of graph neural network. For example, graph neural networks described herein map define a compatibility matrix using belief vectors of nodes. The compatibility matrix is learned in an end-to-end learning system as the graph neural network is trained to improve performance of the graph neural network for datasets with heterophily. The trained graph neural network predicts features, types, class labels, etc. of data in the dataset regardless of heterophily or homophily in the dataset, which thereby improves the performance of graph neural networks using real-world datasets.

The following non-limiting example is provided to introduce certain embodiments. A computing device receives (e.g., from a user, client device, a database etc.) a dataset that includes user profile data for a population of users. The dataset may be in the form a graph data structure, or the like, that represents the user profile data as nodes interconnected via edges. Each node of the graph data structure represents a user profile (e.g., a single user) and includes a set of feature that correspond to the user profile. Each node is connected to one or more other nodes of the graph data structure via a directed or undirected edge.

The computing device uses a second neural network to generate a set of predictions for each node of the graph data structure that correspond to values of a characteristic of the node for which the graph neural network will generate a prediction. For example, the second neural network is a classifier that generates a prior belief vector for each node of the graph data structure based on the features of that node. The prior belief vector corresponds to a probability distribution of values of the characteristic of the node. For example, if the characteristic corresponds to a class label (e.g., one of label A, label B, label C, etc.) of the node, the prior belief vector represents a probability distribution that includes each estimated probability that the node corresponds to a particular class label. That is, the prior belief vector includes an estimated probability that the node corresponds to label A, an estimated probability that the node corresponds to label B, an estimated probability that the node corresponds to label C, etc. with the probability distribution summing to one.

The computing device generates a compatibility matrix using the set of prior belief vectors. The compatibility matrix models a probability of nodes of different classes being connected. The computing device propagates the prior belief vector of each node to nodes in the neighborhood of the node (e.g., nodes directly connected to the node) using the compatibility matrix. The computing device then performs a compatibility-guided propagation over k iterations guided by the compatibility matrix. The compatibility-guided propagation updates each node of the graph data structure by aggregating the belief vector of the node and the belief vectors of each node in the neighborhood of the node as guided by the compatibility matrix. The compatibility-guided propagation includes an echo cancelation that prevents the belief vector of a node that was propagated to the nodes in the neighborhood of the node from be propagated back to the node.

The computing device trains the graph neural network the belief vectors and the compatibility matrix by iteratively assigning updating the values of the compatibility matrix while minimizing a loss function. The loss function has three components: 1) a cross entropy loss from the output of the graph neural network, 2) a co-training loss from the second neural network, 3) and a regulation term that ensures the compatibility matrix remains centered around zero. During training, the computing device assigns a class label (e.g., or the characteristic the graph neural network is configured to predict) for each node of the graph data structure that lacks a class label.

By propagating the belief vectors, performing the compatibility-guided propagation of the belief vectors through k iterations, and updating the compatibility matrix by minimizing the loss-function, the computing device trains the graph neural network to perform well on datasets with heterophily and/or homophily. Heterophily includes, for example a characteristic of a dataset in which entities connected in a dataset are assumed to correspond to different classes. For instance, heterophily in a dataset that includes two user profiles that are connected (e.g., based on having visited a same webpage) would not assume that there is similarity between the two user profiles in the characteristics of interest. Homophily includes, for example, a characteristic of a dataset in which entities connected in the dataset are assumed to be similar in the characteristics of interest. For instance, homophily in a dataset that includes two user profiles that are connected (e.g., based on having visited a same webpage) would assume that there is similarity between the two user profiles and thus that the two user profiles must share a common characteristic of interest (e.g. attribute, type, class, etc.)

As described herein, certain embodiments provide improvements to graph neural networks. Generating the graph neural network includes an application of particular processes including the defining the compatibility matrix, belief vector propagation, compatibility-guided propagation, and the like to achieve an improved technical effect in the performance of the graph neural network on real-world datasets. In some embodiments, software tools are used to perform operations based on predictions generated by the graph neural network. Examples of operations include, but are not limited to, modifying an operation environment of the graph neural network (e.g., user interfaces corresponding the graph data structure of the graph neural network, modifying datasets processed by the graph neural network, modifying the graph neural network itself), modifying interactive content in a manner that is specific to a target entity (e.g., user or computing device associated with a user profile, etc.), generating a recommendation for modifying interactive content in a manner specific to a target entity, transmitting interactive content to a particular computing device associated with a target entity, combinations thereof, and the like.

Example of an Operating Environment for Determination of Class Labels for Nodes of a Graph Referring now to the drawings, FIG. 1 depicts an example of a computing environment for configuring and using a graph processing system that uses CPGNNs to determine class labels for nodes of input graphs, in accordance with certain embodiments described in the present disclosure. In the example depicted in FIG. 1, a computing environment 100 includes one or more graph processing systems 104 and a training system 136. The graph processing system 104 includes one or more computing devices that execute program code providing a dataset-processing software tool. The graph-processing system 104, as illustrated in FIG. 1, includes a compatibility-guided prorogation graph neural network (CPGNN) 108, a user interface engine 112, and a neural network 124. In some instances, the graph processing system 104 may include multiple CPGNNs 108 and/or neural networks 124. In those instances, each CPGNN 104 is paired with a neural network 124 (e.g., in a one-to-one manner if more than one neural network 124 is present or in a many-to-one manner if there are fewer neural networks 124 than CPGNNs 108).

The graph-processing system 104 communicates with a user device 118 and/or one or more other devices (not shown) using user interface (UI) engine 112 to receive an input graph 120. For example, the user device 118 transmits the input graph 120 to the UI engine 112 of graph processing system 104. Alternatively, the user device 118 may cause the transition of the input graph 120 from another source such as a computing device, database, server, training system 136, or the like by transmitting a location of the input graph 120 to graph processing system 104 for graph processing system 104 to obtain or transmitting a communication to the other source requesting the transmission of the input graph 120. The user device 118 may also transmit rules for processing the input graph 120, constraints for processing the input graph 120, metadata associated with the input graph, labels for one or more nodes of the input graph 120, or the like. For example, the user device 118 transits rules that indicate a type of prediction that the CPGNN is to generate (e.g., such as class labels, one or more features, a type, etc.) upon processing the input graph 120.

The input graph 120 is a graph data structure that includes a set of nodes that are interconnected by edges. The graph data structure represents (or models) a dataset. An example of a dataset includes user profiles (e.g., data associated with individual users). In this example, each node of the graph data structure represents a user profile using a feature vector. In some instances, nodes may be incomplete (e.g., include a subset of a maximum quantity of features) or include mismatching quantities of data relative to other nodes. In the user profile example, a first user profile includes demographic (e.g., such a, age, gender, etc.) information associated with a user of the user profile while second user profile includes connection information (e.g., Internet Protocol address, Media Access Control address, a geographic location of a device used to connected to the webpage, etc.) but not demographic information. Each node of the graph data structure is associated with a class label or an indication that the node is unlabeled (e.g., the class label is unknown).

The edges of a graph may be directed (e.g., indicate a starting node and a destination node) or undirected. The edge may indicate that two nodes share some characteristics or connections, but may not imply similarity in the characteristics to be predicted (e.g., class labels, one or more features, a type, etc.) between connected nodes. In one example, two nodes are connected by an edge indicating an order in which the data associated with the nodes was generated or received. While the two nodes are connected by an edge, the nodes do not necessarily bear similarity in the characteristics of interest, (e.g., correspond to different classes, types, include distinct features, etc.).

UI engine 112 executes program code to provide an interface between the graph processing system 104 and user device 118 and/or one or more other devices. In some instances, the interfaces are graphical user interfaces that provide graphical representations of the input graph 120, the processed input graph 120 (e.g., the output from the CPGNN 108), and information associated with the configuration and/or execution of the graph processing system 104. The UI engine 112 also executes program code that generates outputs, such as visual indicators of the belief vectors and compatibility matrices. For instance, the UI engine 112 could use the belief vectors and compatibility matrices to generate a visual representation of the input graph 120 with a representation of class labels, features, types, etc. of each node.

The UI engine 112 includes one or more elements for identifying the input graph 120 to the graph-processing system 104. In one example, the UI engine 112 provides a graphical interface with an input element configured for uploading the input graph from a memory device on or associated with the user device 118 to the graph-processing system 104. In another example, the user interface engine 106 provides a graphical interface with an input element configured for identifying a location, such as network address or memory address, from which the graph-processing system 104 can obtain the input graph 120.

In some embodiments, the UI engine 112 exposes interfaces (e.g., such as application programming interfaces or the like) for enabling configuration of the graph processing system 104 by the user device 118 and/or one or more other devices or for modifying an input into a format usable by the graph processing system 104. For instance, if the input graph 120 is not in a format (e.g., file types, data structure types, etc.) that cannot be processed by graph processing system 104, UI interface 104 pre-processes the input graph 120 to format the input graph 120 into a format that can be processed. In some instances, UI engine 112 may also format the input graph 120 according to the input received from user device 118 including, but not limited to, structuring input graph 120, adding nodes and/or edges, removing nodes and/or edges, combinations thereof, and the like. UI engine 112 then passes the input graph 120 and the input from user device 118 to neural network 124.

The graph processing system 104 executes neural network 124 to generate prior belief vectors 128 for the nodes of the graph data structure. Neural network 124 is a classifier that generates a set of predictions that correspond to estimations of possible class labels (or the characteristic that to predicted by the CPGNN 108) based on the feature vectors of the nodes. In some instances, the neural network 124 may be any neural network that does not assume homophily in generating predictions. A prior belief vector is a probability distribution that indicates a probability for each possible class label that a node can be assigned. For instance, class labels A, B, and C, the belief indicates a probability that the node corresponds to label A, a probability that the node corresponds to label B, and a probability that the node corresponds to label C, with the sum of the probabilities being equal to 1. The output of prior belief vectors 128 from neural network 124 is passed to CPGNN 108.

In some embodiments, the prior belief vectors 128 are generated during a pre-training phase of graph processing system 104. In the pre-training phase, the neural network 124 is trained by training engine system 136. Training system 136 includes training engine 140, which directs the pre-training and training of neural network using training data 144. Training data 144 is data that is associated with or corresponds to the input graph 120 (e.g., of a similar type, or the like). Alternatively, training data 144 is any data that enable neural network 124 to be trained to generate belief vectors. Alternatively still, training data 144 is based on input graph 120. In that instance, the training data 144 utilizes labels of nodes that are included in the input graph 120 when the input graph 120 is input to the graph processing system 104. The neural network 124 is trained by training engine 140 over a predetermined number of iteration and during which, the neural network extrapolates from the labeled nodes, the prior belief vectors for nodes that are unlabeled. During each iteration, the neural network is updated using a loss function that is based on cross-entropy loss and L2 regulation weight.

CPGNN 108 receives the prior belief vectors 128 from neural network 124 and the input graph 120. Graph processing system 104 initializes a compatibility matrix 116 (also represented herein as $\bar{H}$). In some instances, such as those in which CPGNN 108 includes a weight matrix, the compatibility matrix 116 may replace the weight matrix. The compatibility matrix 116 indicates a probability that nodes that are connected correspond to different classes. The compatibility matrix 116 may be initialized by an estimation Ĥ of the unknown (e.g., at the time of initialization) compatibility matrix 116 using the prior belief vectors 128 generated during pre-training and class labels of nodes in a training data 144 of training system 136. Alternatively, the compatibility matrix 116 may be initialized using the prior belief vectors 128 and class labels of nodes of the input graph 120 (e.g., nodes that are already labeled with a class label when input to the graph processing system 104). In some instances, estimating the values of the compatibility matrix 116 may further be based on a mask matrix and a function that ensures the initialized compatibility matrix 116 is doubly stochastic (e.g., each row adds up to one and each column adds up to one).

The CPGNN 108 uses the compatibility matrix 116 and the prior belief vectors 128 to propagate the prior belief vectors to neighboring nodes. For example, the CPGNN 108 iterates across the set of nodes and for each node of the set of nodes, the CPGNN 108 propagates the prior belief vector of that node to the nodes in the neighborhood of that node using the compatibility matrix 116. The nodes within a neighborhood of the nodes include nodes that are directly connected to the node. In some instances, the input for user device 118 may include a neighborhood parameter that indicates that nodes within a distance from the node are to be considered by CPGNN 108 as a neighbor of the node. For example, the neighborhood parameter may be an integer that is greater than or equal to one, where one indicates that nodes that are directly connected to the node are in the node's neighborhood, two indicates nodes that are directly connected to nodes that are directly connected to the node are in the node's neighborhood, etc.

The CPGNN 108 then performs a compatibility-guided propagation that, for each node of the graph data structure, aggregates the belief vector of the current node and the belief vectors of each node within a neighborhood of the current node and updates the belief vector of current node. The CPGNN 108 may include an echo cancelation term that prevents the value propagated from the current node to the neighbors of the current node from being included in the aggregated belief vectors of the nodes in the neighborhood of the current node. The CPGNN 108 performs the compatibility-guided propagation for a predetermined number of iterations updating the belief vectors of each node. The predetermined number of iterations (e.g., represented herein as k), may be an integer that is greater than or equal to one. The predetermined quantity of iterations may be determined based on a threshold probability (e.g., a probability that a node is a particular class label is reached, a threshold difference between a highest probability of a class label and a next highest class label, etc.), input from the user device 118, a threshold accuracy of the CPGNN 108, based on a quantity of nodes in the graph data structure, combinations thereof, or the like. Updated belief vectors 132 includes the state of each belief vector of each iteration of the compatibility-guided propagation. In this example, once the compatibility-guided propagation terminates (e.g., after the predetermined quantity of iterations), the updated belief vectors 132 become the final belief vectors for the CPGNN 108.

The CPGNN 108 updates the values in the compatibility matrix 116 based on the updated belief vectors and a loss function. The CPGNN 108 may update the compatibility matrix 116 after the compatibility-guided propagation or after each iteration of the compatibility-guided propagation. The loss function may be based on the cross entropy loss of the CPGNN 108 (e.g., predicted class labels), a co-training loss from the neural network 124, and a regularization term that keeps the compatibility matrix 116 centered around zero. The co-training loss from the neural network 124 measures the distance of prior belief vectors 128 to the ground-truth distribution for nodes in the training data (e.g., the training data 144 or the node labels into with the input graph 120) while optimizing the final belief vectors.

The final belief vectors have many uses across various domains and downstream tasks. For instance, the CPGNN 108 generates predictions of a class label for each node of the graph data structure of the input graph 120 using the final belief vectors. The CPGNN 108 selects, as the class label for a node, the class label in the final belief vector having a highest probability. Additional analysis can then be performed on the input graph 120 based on the predicted class labels. The final belief vectors allow CPGNN 108 to predict class labels without assuming homophily among nodes of the input graph 120.

The graph processing system 104 communicates the results of processing input graph 120 to the user device 118 through UI engine 112. As previously described, UI engine 112 may provide a graphical user interface for the user device 118 that presents a graphical representation of the input graph 120, the processed input model (e.g., as output from the CPGNN 108, and information obtained from execution of the graph process system 104 such as performance of neural network 124 and/or (e.g., based on to mean absolute error, root mean squared error, percent correct classification, or the like), intermediate results, prior belief vectors 128, final belief vectors, and/or the like.

Graph processing system, as described above, includes operations performed by UI interface 112 CPGNN 108, and neural network 124. In some embodiments, some or all of the operations of graph processing system 104 may be performed by CPGNN 108 or neural network 124. In addition, training of the neural network 124 and CPGNN 108 may be performed by training system 136 (e.g., by training engine 140) as previously described or instead by graph processing system 104, CPGNN 108, and/or neural network 124

Figure 2:
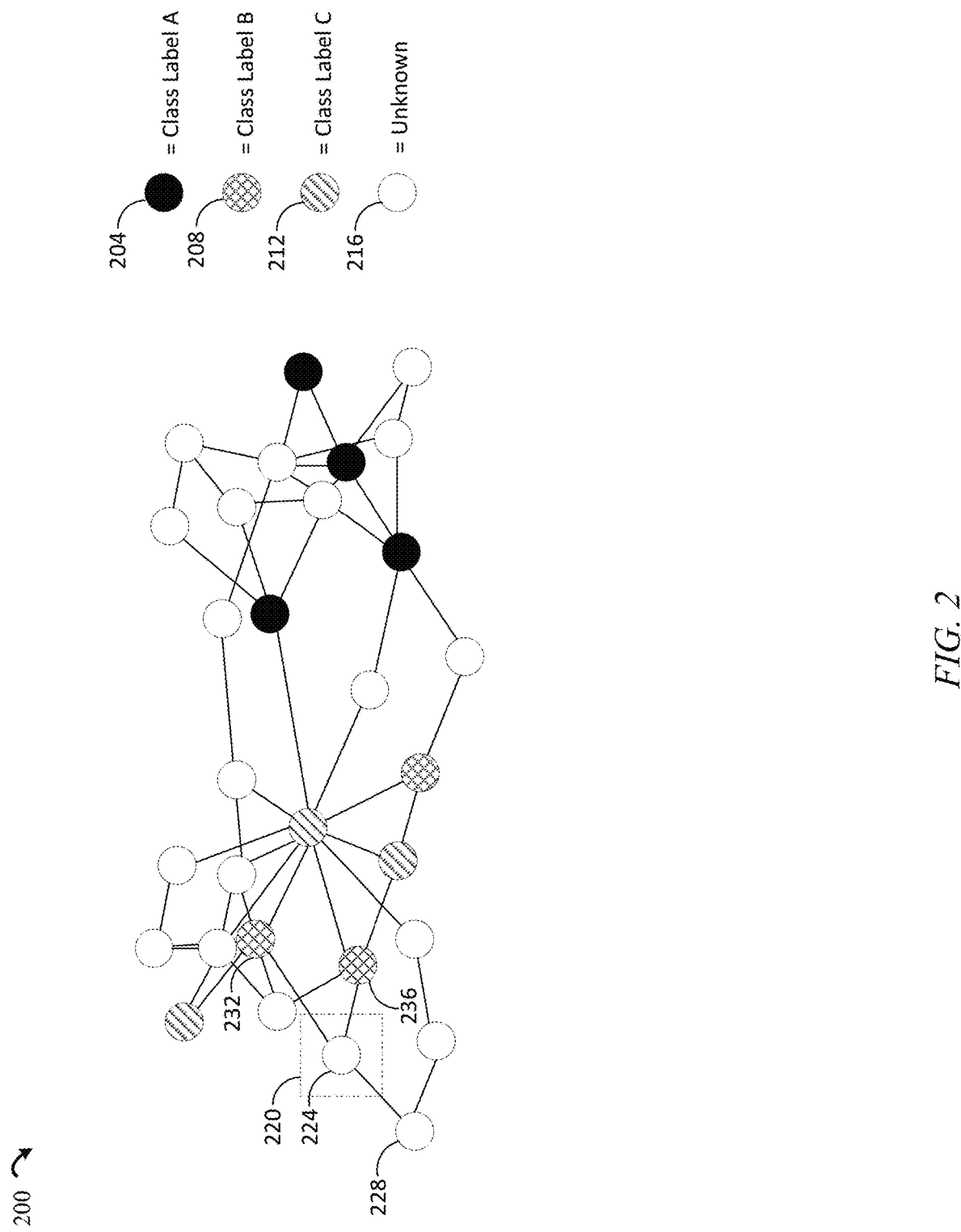
FIG. 2 depicts an example of an input graph data structure that is processed by a graph processing system, in accordance with certain embodiments described in the present disclosure.

Example of Operations for Training and Using a Model to Determine Class Labels of a Graph FIG. 2 depicts an example of an input graph data structure that is processed by a graph processing system, in accordance with certain embodiments described in the present disclosure. Graph data structure 200 is a graphical representation of a dataset that is to be processed by a graph processing system (e.g. such as graph processing system 104 of FIG. 1). In some instances, the input to the graph processing system may be graph data structure 200. In other instances, the input to the graph processing system may be structured data that can be though not necessarily is represented in graphical form. Graph data structure 200 includes set of nodes that corresponds to discrete portions of the dataset. As an example, the dataset may represent a set of user profiles and each node may correspond to a user profile. The nodes are connected via edges that establish a correspondence between two nodes. Though two nodes may be connected by an edge, the connection does not imply that the nodes are similar in the characteristics of interest (e.g., having a same class label, feature, feature vector, type, or the like). Graph data structure 200 includes mixed homophily and heterophily.

The graph data structure includes one or more labeled nodes (e.g., the label corresponding to a characteristic of the node that is to be predicted by the graph processing system)

and one or more unlabeled nodes. For example, nodes may be labeled with a class label. As shown, nodes 204 labeled with class label A may be represented with a solid circle, nodes 208 labeled with class label B may be represented with a cross-hatching, nodes 212 labeled with class label C may be represented with diagonals, and unlabeled nodes 216 may be represented as an empty circle. Though specific representations of each class label are described, nodes may be represented with a graphical indication to indicate a class label such as a particular color, alphanumeric code, symbol, or the like. In not graphical representations of graph data structure 200, the class labels may be represented as any alphanumeric code.

The graph data structure 200 is processed node-by-node in a number of iterations by CPGNN. Each node may be processed based on the neighborhood (e.g., nodes directly connected to that node). For instance, the neighborhood 220 of node 224 is shown and described in FIGS. 3-5 in connection with the operations performed during training and use of the graph processing system. The neighborhood 220 of node 224 includes the unlabeled node 224, the unlabeled node 228, the labeled node 232 (e.g., with class label B), and the labeled node 236 (e.g., also labeled with class label B).

Figure 3:
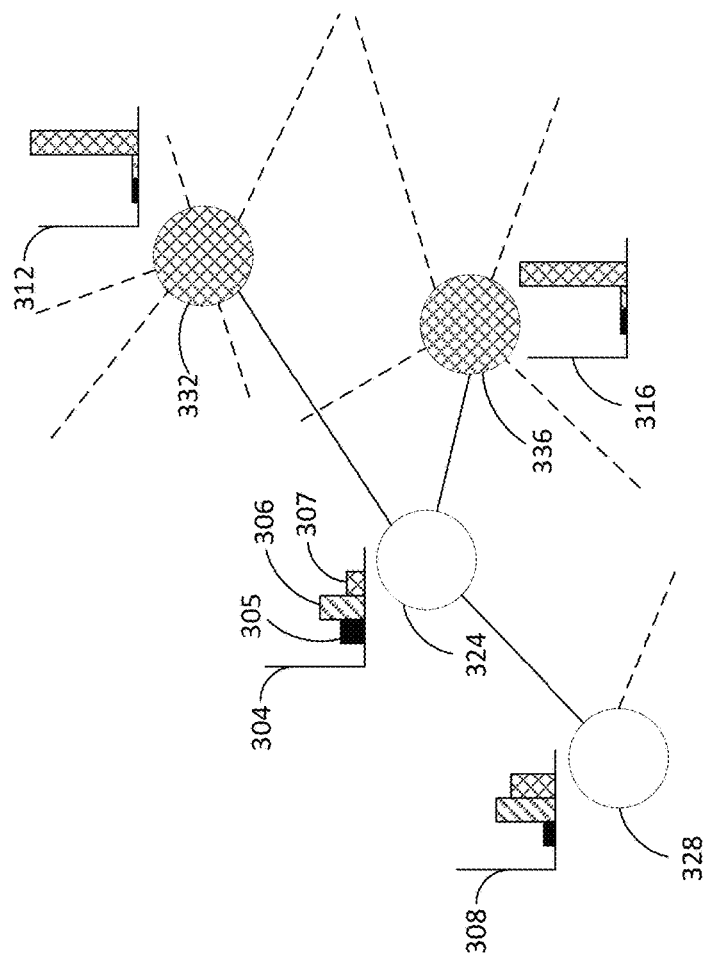
FIG. 3 depicts an example of a CPGNN defining prior belief vectors for nodes of a graph data structure, in accordance with certain embodiments described in the present disclosure.

FIG. 3 depicts an example of a CPGNN defining prior belief vectors for nodes of a graph data structure, in accordance with certain embodiments described in the present disclosure. Graph data structure 300 corresponds to neighborhood 220 of FIG. 2 and includes the unlabeled node 324, the unlabeled node 328, the labeled node 332 (e.g., with class label B), and the labeled node 336 (e.g., also labeled with class label B).

A first neural network (e.g., referred to herein as a neural network or a prior belief estimator) of the graph processing system may be pre-trained for a predetermined quantity of iterations (represented as $\beta_1$) to generate a prior belief matrix $B_p$ based on the features of each node. The prior belief matrix includes a prior belief vector of each node in the graph data structure. The first neural network may be any neural network that does not implicitly assume homophily. An example of such a neural network includes, but is not limited to, a multi-layer perceptron. By pre-training the first neural network, the graph processing system can train a compatibility matrix (represented as $\overline{H}$) using informative prior beliefs of the nodes. Pre-training the first neural network can increase a final performance of the CPGNN. During pre-training, the graph process system minimizes the loss function $\mathcal{L}_p(\Theta_p) = \Sigma_{v \in T_v} \mathcal{H}(B_p(v;\Theta_p), y_v) + \lambda_p \|\Theta_p\|_2$. In the loss function, $\Theta_p$ are trainable parameters of the first neural network, $v$ corresponds to a node, $y_v$ are known class labels for the training set $T_v$ (e.g., a separate dataset that includes ground-truth data or corresponding to the nodes of the graph data structure for which labels are already known), $\mathcal{H}$ corresponds to the cross entropy function, and $\lambda_p$ is the L2 regularization weight (e.g., ridge regression) for the prior beliefs.

The prior beliefs include a probability distribution that indicates a probability that a node corresponds to a particular class label. For instance, the prior belief vector 304 of node 324 illustrates the probability 305 that node 324 corresponds to label A, the probability 306 that node 324 corresponds to label B, and the probability 307 that node 324 corresponds to label C. Prior belief vector 308 of node 328 also includes a probability that that node 328 corresponds to each of label A, label B, and label C. Nodes 332 and 336 were input to the graph processing system with a respective label. As a result, the prior belief vectors 312 and 316 of nodes 332 and 336 respectively indicate that the probability that the node corresponds to label B (e.g., the input label) is close one. While the probabilities that node 332 or 336 correspond to label A or label C are close to zero.

In some instances, the graph processing system presents the nodes each neighborhood (e.g., such as neighborhood 220) and the prior belief vector of each node via a graphical user interface to represent the pre-training of the first neural network. For instance, FIG. 3 depicts an example in which the prior belief vectors are represented graphically as bar graphs. The prior belief vectors may be represented in any alphanumerical or graphical format configured to convey the individual probabilities of each possible class label.

The graph processing system initializes the compatibility matrix $\hat{H}$ based on the prior belief matrix $B_p$. Specifically, the graph processing system initializes the parameters of $\overline{H}$ with an estimation $\hat{H}$ of an unknown compatibility matrix H prior belief matrix $B_p$. In some embodiments, the graph processing system derives the estimation of H using node labels in training set $Y_{train}$ (e.g., a separate dataset that includes ground-truth data or corresponding to the nodes of the graph data structure for which labels are already known) and prior belief matrix $B_p$ estimated in using $B_p$=softmax ($R^{(k)}$) where $R^{(k)}$ is the final layer output of the first neural network. For example, if the first neural network is a graph-agnostic multi-layer perceptron ("MLP"), $R^{(k)}$ may be a k-th layer formulated to be $R^{(k)}=\sigma(R^{(k-1)}W^{(k)})$ where $R^{(0)}$ is input feature matrix X, and $W^{(k)}$ are learnable parameters.

The graph processing system generates a training mask matrix M and an enhanced belief matrix $\tilde{B}$ that make uses of the known class labels in the training set $T_v$. The graph processing system denotes M as $$[M]_{i,j} = \begin{cases} 1, & \text{if } i \in T_v \\ 0, & \text{otherwise} \end{cases}$$

and $\tilde{B}$ as $\tilde{B} = M \circ Y + (1-M) \circ B_p$, in which $\circ$ is the Hadamard (element-wise) product. The graph processing system derives the estimation $\hat{H}$ as $\hat{H} = (\mathcal{S}((M \circ Y)^T A \tilde{B}))$, where A is an adjacency matrix defined as $A \in \{0,1\}^{|V| \times |V|}$ and $\mathcal{S}$ is a function that ensures $\hat{H}$ is doubly stochastic. An example of a function that ensures $\hat{H}$ is doubly stochastic includes, but is not limited to, the Sinkhorn-Knopp algorithm. The graph processing system centers the initial value of $\overline{H}$ around zero by setting $$\overline{H}^{(0)} = \hat{H} - \frac{1}{|y|}.$$

To ensure the rows of $\overline{H}$ remain centered around zero throughout the training process, the graph processing system implements a regularization term $\Phi(\overline{H})$ for $\overline{H}$ as $\Phi(\overline{H}) = \Sigma_i |\Sigma_j \overline{H}_{ij}|$.

Figure 4:
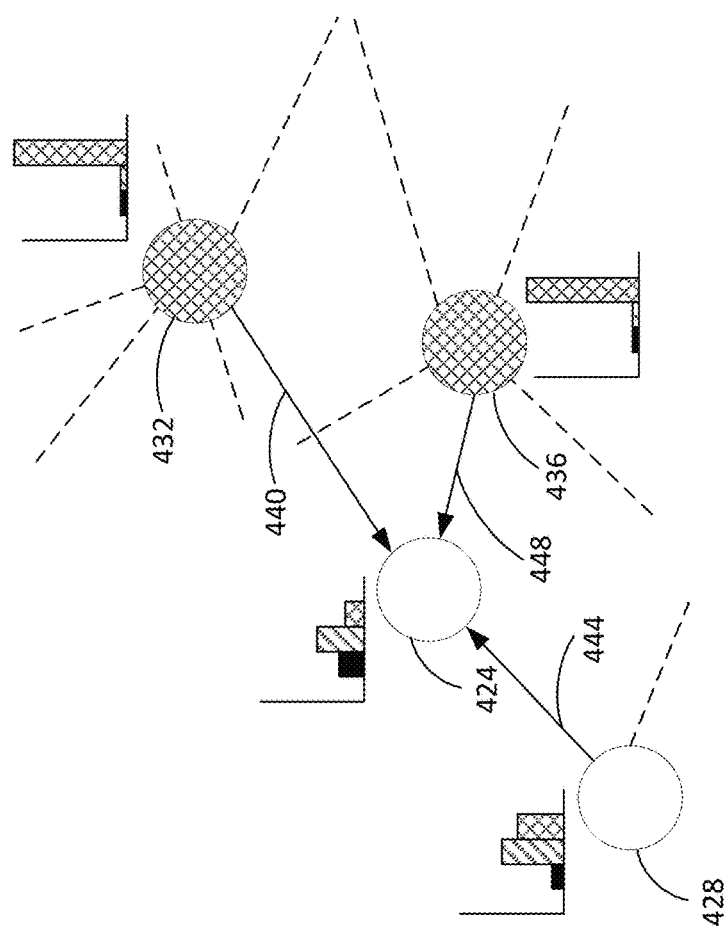
FIG. 4 is an example of a CPGNN propagating belief vectors across nodes of a graph data structure, in accordance with certain embodiments described in the present disclosure.
Figure 5:
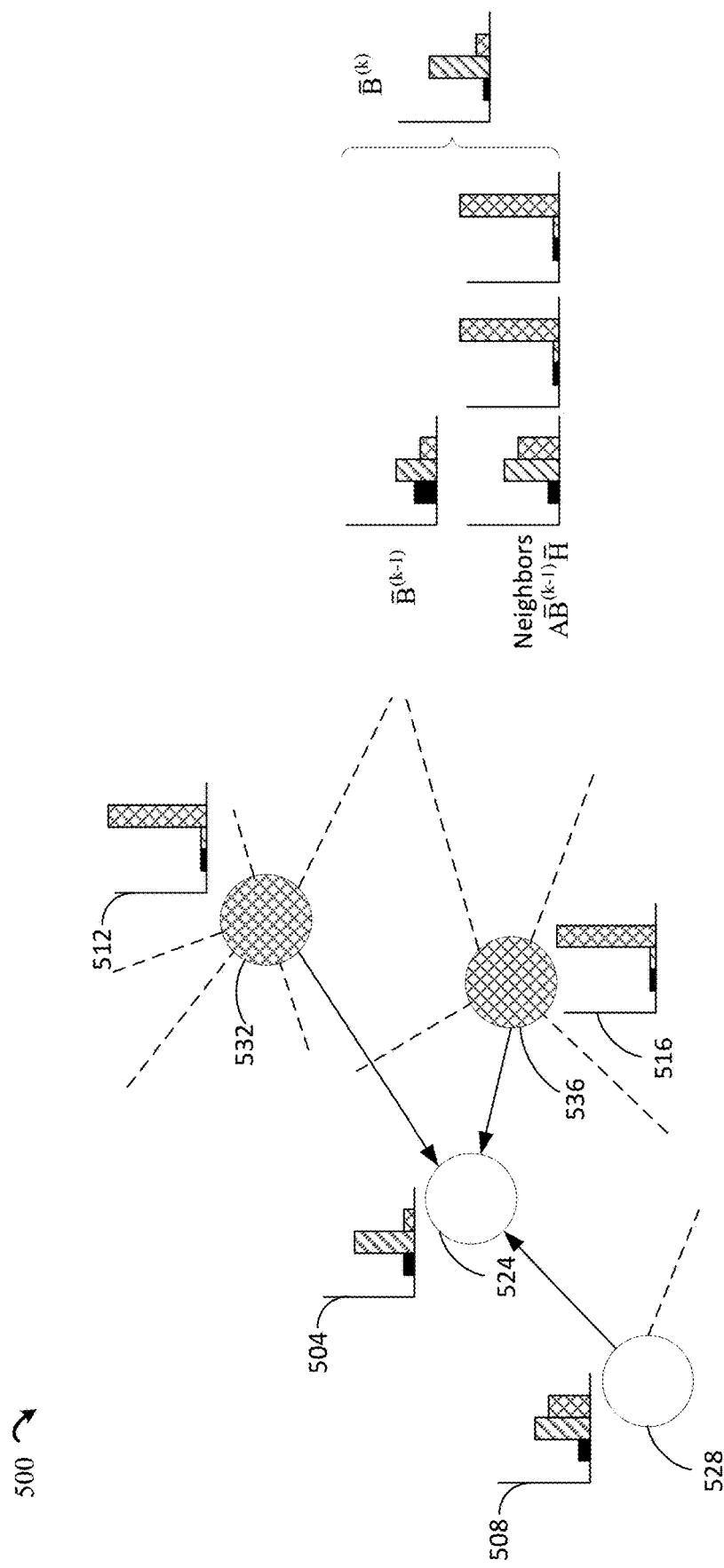
FIG. 5 depicts an example of a CPGNN performing an iteration of a compatibility-guided propagation of belief vectors across nodes of a graph data structure, in accordance with certain embodiments described in the present disclosure.

FIGS. 4-5 depict a compatibility-guided propagation of belief vectors across nodes of the graph data structure. The CPGNN propagates the prior belief vectors of nodes within their neighborhoods using the initialized compatibility matrix $\overline{H}$. To propagate the prior belief vectors through linear formations, the CPGNN centers the prior belief $B_p$ using $$\tilde{B}^{(0)} = B_p - \frac{1}{|y|}$$

where y is the ground-truth class label vector for all nodes. The CPGNN formulates intermediate layers of propagation as $\hat{B}^{(k)}=\sigma(\hat{B}^{(0)}+A\hat{B}^{(k-1)}\overline{H}-D\hat{B}^{(k-1)}\overline{H}^2)$ where A is an adjacency matrix defined as $A \in \{0,1\}^{|v| \times |v|}$, and $D=\text{diag}(\{d_i: i=1, \ldots, |y|\})$ in which $d_i = \Sigma_{j=1}^{|v|} A_{ij}$. The last term in the equation for the intermediate layers of propagation acts as an echo cancellation term that cancels the echo of each node's own belief. For the final layer of propagation, the CPGNN does not include the last term as echo cancellation may not be needed, giving the equation $\overline{B}^{(k)}=\sigma(\overline{B}^{(0)}+A\overline{B}^{(k-1)}\overline{H})$.

FIG. 4 is an example of a CPGNN propagating belief vectors across nodes of a graph data structure, in accordance with certain embodiments described in the present disclosure. The graph data structure 400 corresponds to neighborhood 220 of FIG. 2 and includes the unlabeled node 424, the unlabeled node 428, the labeled node 432, and the labeled node 436.

As shown, belief vectors in the neighborhood of node 424 are propagated to node 424. The prior belief vector of nodes 432 is propagated to node 424 (e.g., as shown by the directed edge 440), the prior belief vector of node 428 is propagated to node 424 as shown by directed edge 444, and the prior belief vector of node 436 is propagated to node 424 as shown by directed edge 448. The propagation may be guided by the initialized compatibility matrix. A simplified representation of the propagation can be defined as $\overline{B}=\overline{B}\cdot\overline{H}$.

FIG. 5 depicts an example of a CPGNN performing an iteration of a compatibility-guided propagation of belief vectors across nodes of a graph data structure, in accordance with certain embodiments described in the present disclosure. The graph data structure 500 corresponds to neighborhood 220 of FIG. 2 and includes the unlabeled node 524, the unlabeled node 528, the labeled node 532, and the labeled node 536.

Each iteration of the compatibility-guided propagation updates the belief vectors of each node based on the propagated belief vectors of the nodes in the neighborhood. For example, the node 524 aggregates the prior belief vectors received from nodes 528, 532, and 536 (as described in FIG. 4) to update the belief vector 504 of node 524. The updated belief vector of the intermediate layer of propagation (e.g., in which the current iteration is not the last iteration) is $\hat{B}^{(k)}=\sigma(\hat{B}^{(0)}+A\hat{B}^{(k-1)}\overline{H}-D\hat{B}^{(k-1)}\overline{H}^2)$. The term $D\hat{B}^{(k-1)}\overline{H}^2$ is provide echo cancellation to prevent the propagation of the belief vector of a node in previous iterations from affecting the updated belief vector of that node.

For instance, node 524 propagates the belief vector 504 to nodes 532, 536, and 528 and received belief vectors from node 532, 536, and 528. The echo cancelation prevents the belief vector 504 that was propagated to the other nodes (e.g., during this or the previous iteration) from being used to update the belief vector 504 (during this iteration). In some instances, the CPGNN performs the propagation operation as described in FIG. 4 with respect to each node of graph data structure, then update the belief vectors based on the aggregation operation. In other instances, the CPGNN performs the propagation and aggregation operations in parallel (e.g., with multiple nodes being propagated and aggregated at a same time). In still further instances, the compatibility-guided propagation is performed as a single composite operation (e.g., rather than as separate operations).

Figure 6:
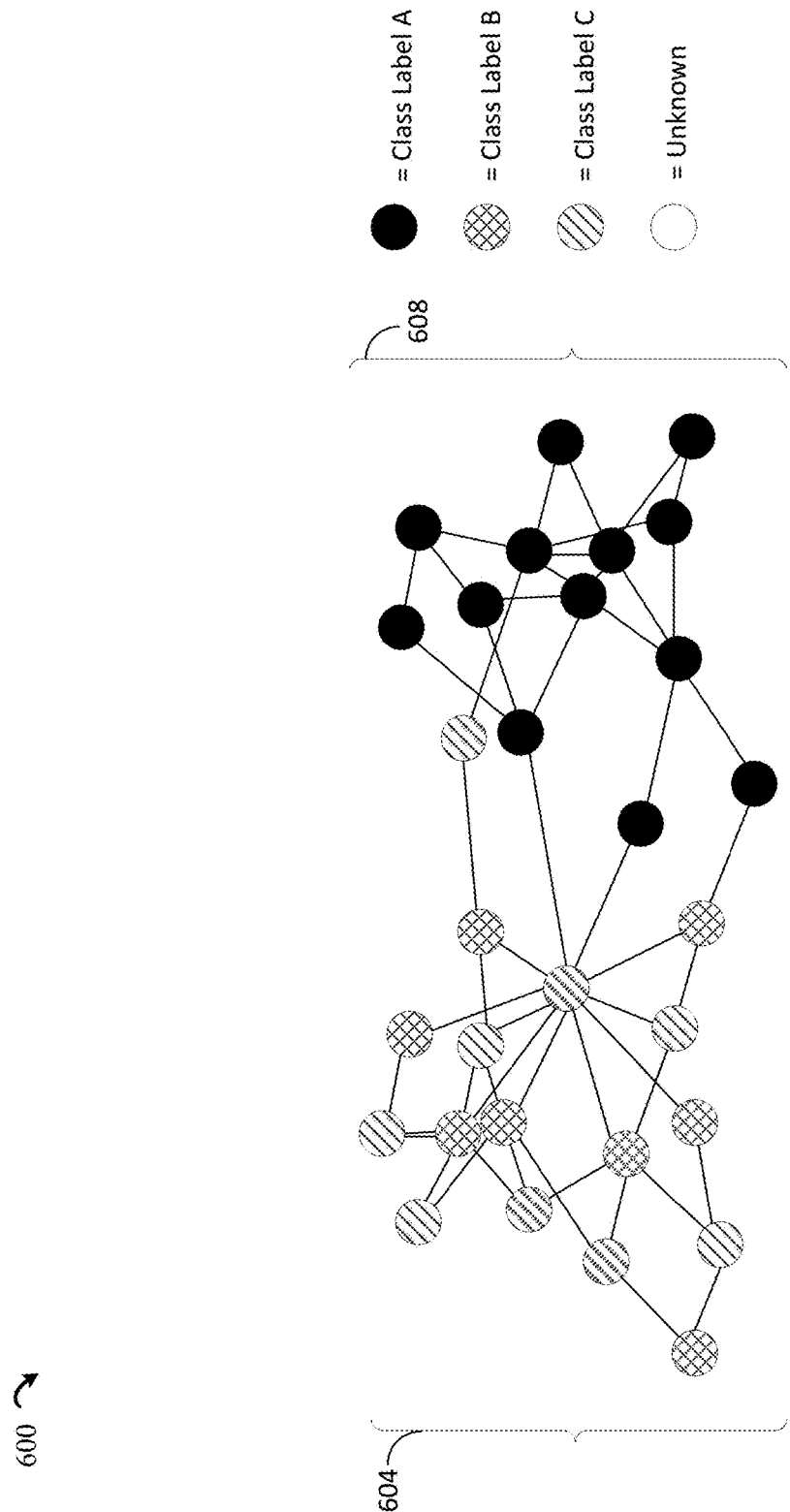
FIG. 6 depicts an example of a trained CPGNN, in accordance with certain embodiments described in the present disclosure.

FIG. 6 depicts an example of a trained CPGNN, in accordance with certain embodiments described in the present disclosure. After k layers of propagation (iterations), the CPGNN outputs the final belief matrix $B_f$ that corresponds to the final belief vectors for each node. The final belief matrix includes a probability distribution that indicates probabilities in which the node corresponds to each possible class label. The final belief for a node of the graph data structure is determined by $B_f=\text{softmax}(\overline{B}^{(K)})$. For a node v, the final belief can additionally be expressed as $B_f(v,\overline{H}, \Theta_p)$ which takes into account the parameters $\Theta_p$ from the prior belief estimation stage.

In some embodiments, once the compatibility-guided propagation completes and the final belief vectors are generated, the CPGNN is trained according to the loss function: $\mathcal{L}_f(\overline{H},\Theta_p)=\Sigma_{v \in T_v} \mathcal{H}(B_f(v;\overline{H},\Theta_p),y_v)+\eta \mathcal{L}_p(\Theta_p)+\Phi(\overline{H})$. The loss function includes three parts. The first is the cross entropy loss from the CPGNN output, the second is the co-training loss from the prior belief estimator, and the third is the regularization term that keeps $\overline{H}$ centered around zero. The co-training loss from the prior belief estimator measures the distance of prior beliefs to the ground-truth distribution for nodes in the training set while also optimizing the final beliefs. During this operation, the CPGNN generates predictions for each unlabeled node of the graph data structure and updates the compatibility matrix based on the final belief vectors.

In some instances, the CPGNN predicts a class label for a node by identifying from the probability distribution of the final belief vector the class label having a highest probability. In other instances, the CPGNN also determines if the identified class label is greater than a probability threshold. If the assigned class label is greater than the probability threshold, then the CPGNN assigns the class label to the node. If the assigned class label is not greater than the probability threshold, the CPGNN may indicate that the node is to remain unlabeled. For example, if the CPGNN is trained to predict a class label from 10 possible class labels, it may be possible that the probability of each class label is less than the probability threshold (e.g., 50%, or the like) with the combined probabilities still summing to one. If a node remains unlabeled one more actions may be taken such as, but not limited to retraining the CPGNN, requesting additional features for the node and generating an updated belief vector, requesting user input to verify the prediction, or the like.

As noted in FIG. 6, the graph data structure represents a dataset including mixed homophily and heterophily. The left portion 604 of the graph represent the portion of the dataset with heterophily. As shown, the left portion 604 includes a distribution of nodes in which that are not connected necessarily connected to nodes of a same class label. The right portion 608 of the graph data structure represents the portion of the dataset with homophily. The nodes of the right portion 608 of the graph data structure are more likely to be connected to another node that shares as a same class label. CPGNNs trained as described herein are configured to operate on datasets with homophily, heterophily, and mixed homophily and heterophily.

A trained CPGNN may output the graph data structure to a user device (e.g., such as user device 118 of FIG. 1), to a display device (e.g., via a graphical user interface), a database, or the like. The CPGNN may continue to process new data added to the dataset. For example, data corresponding to a new node may be added to the graph data structure as an unlabeled node. The CPGNN may then process the new node (as previously described) to generate a final belief vector that can be used to predict the class label of the new node.

Figure 7:
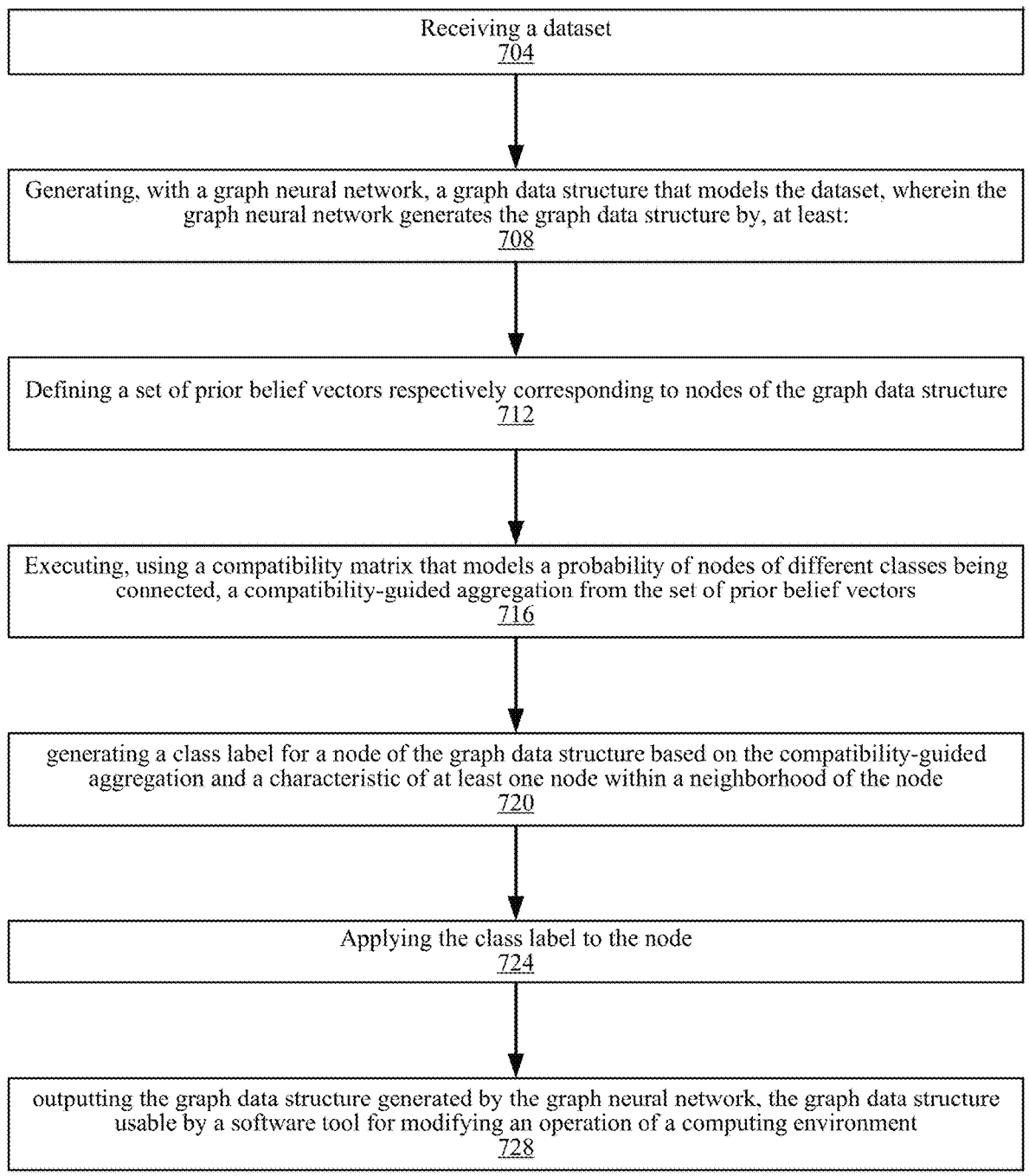
FIG. 7 depicts an example of a process for training and using a CPGNN to predict a characteristic of nodes of a graph data structure, in accordance with certain embodiments described in the present disclosure.

Example of Operations for Training and Using a Model to Determine Class Labels of a Graph FIG. 7 depicts an example of a process for training and using a CPGNN to predict a characteristic of nodes of a graph data structure, in accordance with certain embodiments described in the present disclosure. At block 704, a computing device receives a dataset. In some instances, the dataset is or includes an input graph that represents data as nodes that are connected via edges. Each edge connects two nodes based on a related feature of the two nodes. In other instances, the dataset may be structured data. In those instances, the computing device (or another device) generates an input graph from the dataset. The dataset may be received from a user device (e.g., such as user device 118 of FIG. 1), from a server, or the like. In some instances, the computing device may retrieve the dataset (e.g., from a user device, server, database, etc.). The computing device is processing device that includes program instructions that when executed by one or more processors of the computing device perform some or all of the operations described in connection to FIG. 7.

At block 708, the computing device processes, with a CPGNN, the dataset (e.g., including the input graph) generating a new graph data structure that includes extrapolated additional properties of nodes (e.g., features, feature vectors, class labels, types, etc.).

The CPGNN processes the dataset by, at block 712, defining a set of prior belief vectors respectively corresponding to nodes of the graph data structure. The CPGNN uses a prior belief estimator (e.g., a second neural network such as neural network 124 of FIG. 1) that generates belief vectors for each node of the graph data structure. The prior belief estimator may be any neural network that does not implicitly assume homophily. The CPGNN is configured to generate a prediction that corresponds to a characteristic of a node of the graph data structure. Examples of characteristics include, but are not limited to, a feature, a feature vector, a class label, a type, combinations thereof and the like. The belief vectors include a probability distribution that indicates a probability for each possible value of the characteristic of the node. For example, if the CPGNN is configured to predict class labels that label A, label B, or label C, the belief vector of a node includes a probability that the node corresponds to label A, a probability that the node corresponds to label B, and probability that the node corresponds to label C. The sum of the probabilities of the probability distribution equal to one.

The prior belief estimator may generate a training belief vectors during a pre-training phase of the CPGNN. The training belief vectors may be generated based on the features of each node. In some instances, the training belief vectors may be the belief vectors. In other instances, the training belief vectors may be initial belief vectors that are updated to form the belief vectors.

Generation of the graph data structure continues at block 716, where the CPGNN executes, using a compatibility matrix that models a probability of nodes of different classes being connected, a compatibility-guided propagation using the set of prior belief vectors. The compatibility matrix is initialized using the training belief vectors generated during the pre-training phase of the CPGNN. The CPGNN uses the compatibility matrix and the belief vectors to perform a compatibility-guided aggregation. The compatibility-guided aggregation: 1) propagates the prior belief vector of each node to the nodes within the neighborhood of the node, and 2) aggregates the belief vector of a node with the belief vectors prorogated from the nodes connected to the node to update the belief vector of the node. The compatibility-guided aggregation may be performed for k iterations, where k is an integer that is greater than or equal to one. As a result, the belief vector of each node may be updated up to k times.

Generation of the graph data structure continues at block 720, the CPGNN generates a class label for a node of the graph data structure based on the compatibility-guided propagation and a characteristic of at least one node within a neighborhood of the node. The CPGNN may generate the class label for the node of the graph data structure while minimizing a loss function configured to update the compatibility matrix. The loss function is based on the cross entropy loss, a co-training loss from the prior belief estimator, and a regulation term that ensures the compatibility matrix remains centered on zero. In some instances, generating the class label can include identifying, from a belief vector of a node, the class label having the highest probability, and assigning to the node the identified class label. Alternatively, the CPGNN may identify, from a belief vector of a node, the class label having a probability that exceeds a probability threshold.

The minimizing the loss function may correspond to a final operation in training the CPGNN. Minimizing the loss function includes modifying values of the compatibility matrix based on the updated belief vectors generated during the compatibility-guided propagations.

Generation of the graph data structure continues at block 724, in which the identified class label for the node is assigned to the node. This can include modifying the node of the graph data structure to incorporate the identified class label.

At block 728, the computing device outputs the new graph data structure generated by the CPGNN. Outputting the new graph data structure can include, but is not limited to, transmitting the new graph data structure to a user device (e.g., that transmitted the input graph), one or more other devices, a server, a database, combinations thereof, and the like. In some instances, outputting the new graph data structure can include displaying the new graph data structure via a user interface of a display device.

The new graph data structure is usable by a software tool for modifying an operation of a computing environment. In one example, modifying the operation of the computing environment includes modifying, based on an entity relationship represented by edges in the new graph data structure, interactive content in a manner specific to a target entity represented by the node having the class label. The new graph data structure outputted at block 728 is stored in a non-transitory computer-readable medium accessible to a host computing system that provides user devices with access to an online platform or other interactive computing environment. The new graph data structure can be used to identify characteristics of entities that access the online platform or other interactive computing environment with the user devices. These characteristics identified from the new graph data structure can causes one or more features of the online platform or other interactive computing environment to be changed. For example, the host computing system can be used, either automatically or in response to additional user inputs, to modify interactive content delivered from the online platform to a user device. Modifying the interactive content could include rearranging the layout of an interface to present certain interface elements more prominently, including specific links within the interactive content that allow a user device to navigate to certain online platforms, etc.

In another example, modifying the operation of the computing environment can also include modifying a subset of data elements of the dataset based on class labels in the new graph data structure that are generated with the compatibility-guided propagations. The predictions generated by CPGNN can be propagated through the new graph data structure enabling CPGNN or another neural network to generate further predictions based on previous predictions. In one example, predicting a class label for a node enables CPGNN or another neural network to use the class label of the node (and other information associated with the node and/or the new graph data structure, to predict other characteristics of the node or other nodes in the new graph data structure such as features, feature vectors, types, etc. CPGNN enables filling in information of a node that may be incomplete or unknown.

In another example, modifying the operation of the computing environment can include servicing a query to the dataset by retrieving, from the new graph data structure, entity data corresponding to the node having the class label. The new graph data structure outputted at block 728 is stored in a non-transitory computer-readable medium accessible to a host computing system. The host device services queries using the new graph data structure and returning a portion of the dataset represented by the new graph data structure in response to the query. In one example, the query includes a class label. The host device identifies nodes of the new graph data structure that correspond to the class label and returns entity data that corresponding to the identified nodes. The host device uses the new graph data structure to define a population of entities that correspond to a same one or more characteristics (e.g., defined by the query). The host device performs one or more operations based on the population of entities such as, but not limited to, transmitting interactive content in a manner specific to the population of entities, modifying a network resource to transmit interactive content, etc.

Figure 8:
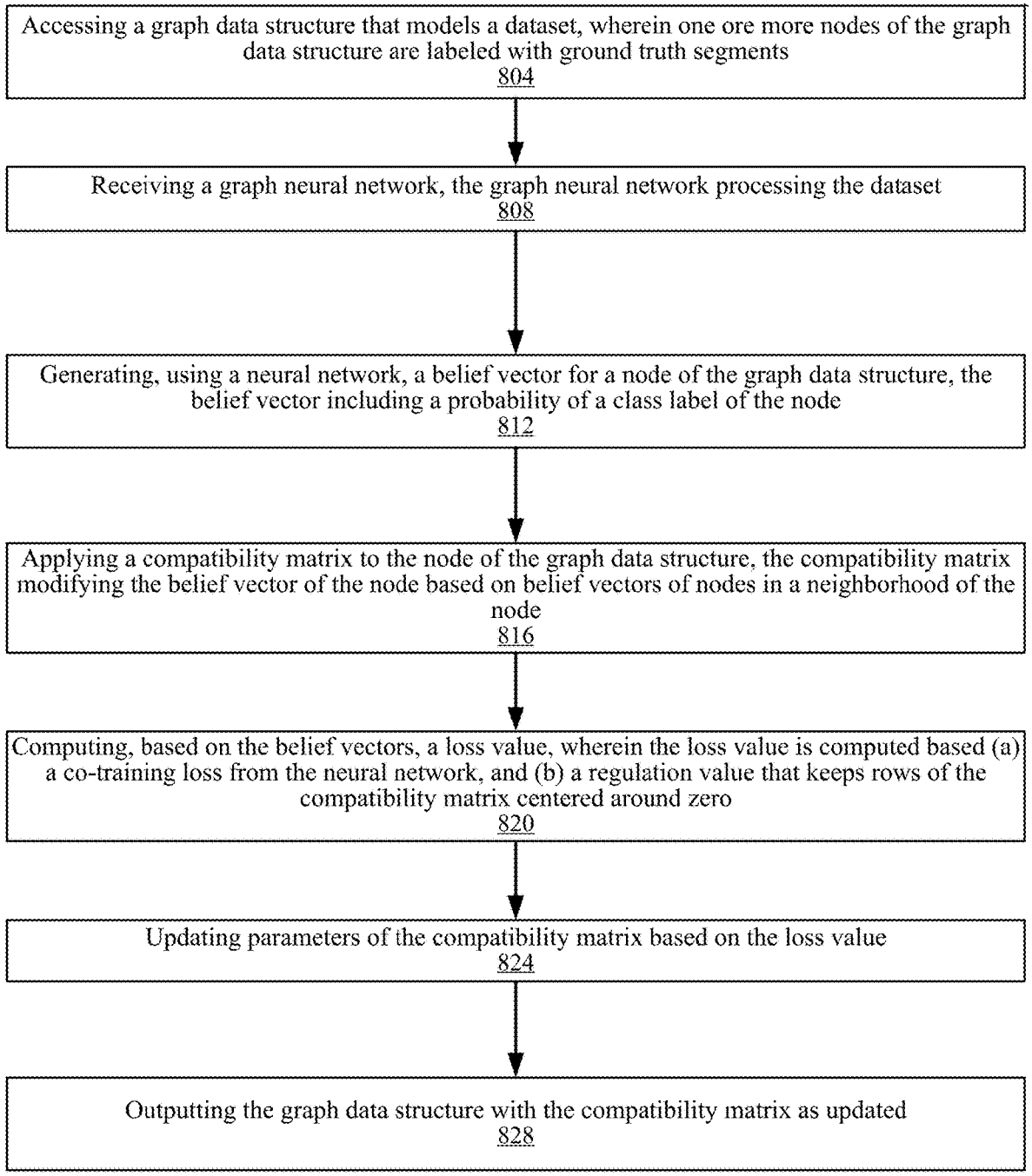
FIG. 8 depicts an example of a process for training a CPGNN to predict a characteristic of nodes of a graph data structure, in accordance with certain embodiments described in the present disclosure.

FIG. 8 depicts an example of a process for training and using a CPGNN to predict a characteristic of nodes of a graph data structure, in accordance with certain embodiments described in the present disclosure. At block 804, a computing device receives a graph data structure that models a dataset. In some instances, the graph data structure includes nodes that are connected via edges. Each edge connects two nodes based on a related feature of the two nodes. In other instances, the computing device receives structured data (e.g., data in a non-graph format). In those instances, the computing device (or another device) generates a graph data structure from the dataset. The dataset may be received from a user device (e.g., such as user device 118 of FIG. 1), from a server, or the like. In some instances, the computing device may retrieve the dataset (e.g., from a user device, server, database, etc.).

One or more of the nodes of the graph data structure include a known value of a characteristic (e.g., a label of a ground-truth segment) of the node for which a CPGNN is to be trained to predict. The remaining nodes of the graph data structure do not include known values for the characteristic. Examples of the characteristic can include, but is not limited to, a class label, a feature, a feature vector, a type, etc. For instance, the dataset includes class labels for some nodes of a graph data structure. The remaining nodes are unlabeled (e.g., do not include class labels).

The computing device may be a processing device that includes program instructions that when executed by one or more processors of the computing device perform some or all of the operations described in connection to FIG. 8.

At block 808, the computing device receives a compatibility-based propagation graph neural network (CPGNN). The CPGNN is an untrained model configured to be trained using the graph data structure to generate prediction that correspond to the nodes of the graph data structure.

At block 812, the computing operates a neural network (e.g., such as neural network 124 of FIG. 1) to generate a belief vector for a node of the graph data structure. The neural network may be any neural network that does not implicitly assume homophily. The belief vector includes a probability distribution that indicates a probability for each possible value of the characteristic of the node. For example, if the CPGNN is configured to predict class labels that correspond to label A, label B, or label C, the belief vector of the node includes a probability that the node corresponds to label A, a probability that the node corresponds to label B, and probability that the node corresponds to label C. The sum of the probabilities of the probability distribution equal to one.

The prior belief estimator may generate the prior belief vectors during a pre-training phase of the CPGNN. The neural network generates the training belief vectors based on the features of the node.

At block 816, The CPGNN applies a compatibility matrix to the node of the graph data structure. The CPGNN uses the compatibility matrix to modify the belief vector of the node based on belief vectors of nodes in a neighborhood of the node. In one example, the compatibility may modify the belief vector as part of a compatibility-guided propagation. The compatibility matrix is initialized using the belief vectors generated during the pre-training phase of the CPGNN. The compatibility-guided aggregation: 1) propagates the prior belief vector of each node to the nodes within the neighborhood of the node guided by the compatibility matrix, and 2) aggregates the belief vector of a node with the belief vectors prorogated from the nodes connected to the node to update the belief vector of the node. The compatibility-guided aggregation is performed for k iterations, where k is an integer that is greater than or equal to one. As a result, the belief vector of each node may be updated up to k times.

In some instances, the compatibility matrix replaces a weight function of the graph neural network. The compatibility matrix is applied to each node and the nodes within the neighborhood of that node at a same with the center of the compatibility matrix being centered around the node. The compatibility matrix is applied in as a sliding window across the graph data structure.

The application of the compatibility matrix to the nodes of the graph data structure iteratively update the belief vector of the node based on the belief vectors of the neighboring nodes. After k iterations, the belief vector of the node is the final belief vector of the node.

At block 820, the CPGNN computes, based on the belief vectors, a loss value, wherein the loss value is computed based on (a) a co-training loss from the neural network, and (b) a regulation value that keeps rows of the compatibility matrix centered around zero. In one example, CPGNN is trained according to the loss function: $\mathcal{L}_f(\overline{H}, \Theta_p) = \Sigma_{v \in T_\theta} \mathcal{H}(B_f(v; \overline{H}, \Theta_p), y_v) + \eta \mathcal{L}_p(\Theta_p) + \Phi(\overline{H})$. The loss function includes three parts. The first part is the cross entropy loss from the CPGNN output, the second part is the co-training loss from the prior belief estimator, and the third part is the regularization term that keeps $\overline{H}$ centered around zero. The co-training loss from the prior belief estimator measures the distance of prior beliefs to the ground-truth distribution for nodes in the training set while also optimizing the final beliefs. During this operation, the CPGNN generates predictions for each unlabeled node of the graph data structure and updates the compatibility matrix based on the final belief vectors.

The CPGNN predicts a class label for a node by identifying from the probability distribution of the final belief vector the class label having a highest probability. In other instances, the CPGNN also determines if the identified class label is greater than a probability threshold. If the assigned class label is greater than the probability threshold, then the CPGNN assigns the class label to the node. If the assigned class label is not greater than the probability threshold, the CPGNN may indicate that the node is to remain unlabeled. For example, if the CPGNN is trained to predict a class label from 10 possible class labels, it may be possible that the probability of each class label is less than the probability threshold (e.g., 50%, or the like) with the combined probabilities still summing to one. If a node remains unlabeled one or more actions may be taken such as, but not limited to retraining the CPGNN, requesting additional features for the node and generating an updated belief vector, requesting user input to verify the prediction, or the like.

At block 824, the CPGNN updates parameters of the compatibility matrix based on the loss value. Minimizing the loss function includes modifying values of the compatibility matrix based on the updated belief vectors generated during the compatibility-guided propagations. This enables the compatibility matrix to be learned in an end-to-end manner (e.g., throughout the training of the CPGNN).

At block 828, the computing device outputs the graph data structure with the compatibility matrix as updated. Outputting the graph data structure can include, but is not limited to, transmitting the graph data structure to a user device (e.g., that transmitted the input graph), one or more other devices, a server, a database, combinations thereof, and the like. In some instances, outputting the graph data structure can include displaying the graph data structure via a user interface of a display device.

The graph data structure is usable by a software tool (e.g., the graph neural network, another software tool, etc.) for modifying an operation of a computing environment. In one example, modifying the operation of the computing environment includes modifying, based on an entity relationship represented by edges in the graph data structure, interactive content in a manner specific to a target entity represented by the node having the class label, as previously described.

In another example, modifying the operation of the computing environment can also include modifying a subset of data elements of the dataset based on class labels in the graph data structure that are generated with the compatibility-guided propagations, as previously described.

In another example, modifying the operation of the computing environment can include servicing a query to the dataset by retrieving, from the graph data structure, entity data corresponding to the node having the class label, as previously described.

Example of a Computing System for Implementing Certain Embodiments

Figure 9:
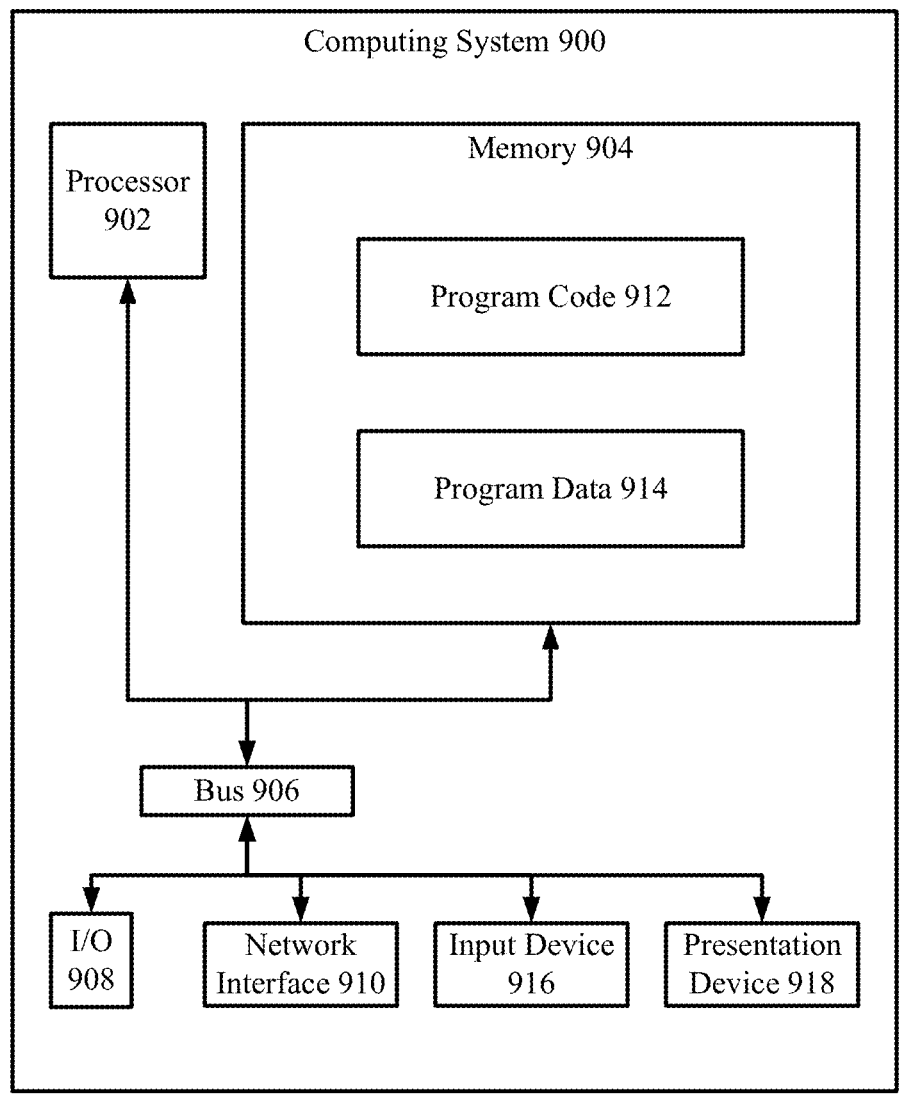
FIG. 9 depicts an example of a computing system suitable for implementing certain embodiments described herein.

Any suitable computing system or group of computing systems can be used for performing the operations described herein. For example, FIG. 9 depicts an example of the computing system 900. The implementation of computing system 900 could be used for one or more of a graph-processing system 104, a user device 118, and a training system 136. In other embodiments, a single computing system 900 having devices similar to those depicted in FIG. 9 (e.g., a processor, a memory, etc.) combines the one or more operations and data stores depicted as separate systems in FIG. 1.

The depicted example of a computing system 900 includes a processor 902 communicatively coupled to one or more memory devices 904. The processor 902 executes computer-executable program code stored in a memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

A memory device 904 includes any suitable non-transitory computer-readable medium for storing program code 912, program data 914, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 900 may also include a number of external or internal devices, an input device 916, a presentation device 918, or other input or output devices. For example, the computing system 900 is shown with one or more input/output ("I/O") interfaces 908. An I/O interface 908 can receive input from input devices or provide output to output devices. One or more buses 906 are also included in the computing system 900. The bus 406 communicatively couples one or more components of a respective one of the computing system 900.

The computing system 900 executes program code 912 that configures the processor 902 to perform one or more of the operations described herein. Examples of the program code 912 include, in various embodiments, algorithms executed by the graph-processing system 104 (e.g., functions of the CPGNN 108), the UI engine 112, the training engine 140, or other suitable applications that perform one or more operations described herein. The program code may be resident in the memory device 904 or any suitable computer-readable medium and may be executed by the processor 902 or any other suitable processor.

In some embodiments, one or more memory devices 904 store program data 914 that includes one or more datasets and models described herein. Examples of these datasets include interaction data, training data, and/or parameter values. In some embodiments, one or more of data sets, models, and functions are stored in the same memory device (e.g., one of the memory devices 904). In additional or alternative embodiments, one or more of the programs, data sets, models, and functions described herein are stored in different memory devices 904 accessible via a data network.

In some embodiments, the computing system 900 also includes a network interface device 910. The network interface device 910 includes any device or group of devices suitable for establishing a wired or wireless data connection to one or more data networks. Non-limiting examples of the network interface device 910 include an Ethernet network adapter, a modem, and/or the like. The computing system 900 is able to communicate with one or more other computing devices (e.g., a user device) via a data network using the network interface device 910.

In some embodiments, the computing system 900 also includes the input device 916 and the presentation device 918 depicted in FIG. 9. An input device 916 can include any device or group of devices suitable for receiving visual, auditory, or other suitable input that controls or affects the operations of the processor 902. Non-limiting examples of the input device 916 include a touchscreen, a mouse, a keyboard, a microphone, and/or a separate mobile computing device. A presentation device 918 can include any device or group of devices suitable for providing visual, auditory, or other suitable sensory output. Non-limiting examples of the presentation device 918 include a touchscreen, a monitor, a speaker, and/or a separate mobile computing device.

Although FIG. 9 depicts the input device 916 and the presentation device 918 as being local to the computing device that executes the graph-processing system 104, other implementations are possible. For instance, in some embodiments, one or more of the input device 916 and the presentation device 918 can include a remote client-computing device that communicates with the computing system 900 via the network interface device 910 using one or more data networks described herein.

Experimental Results

Figure 10:
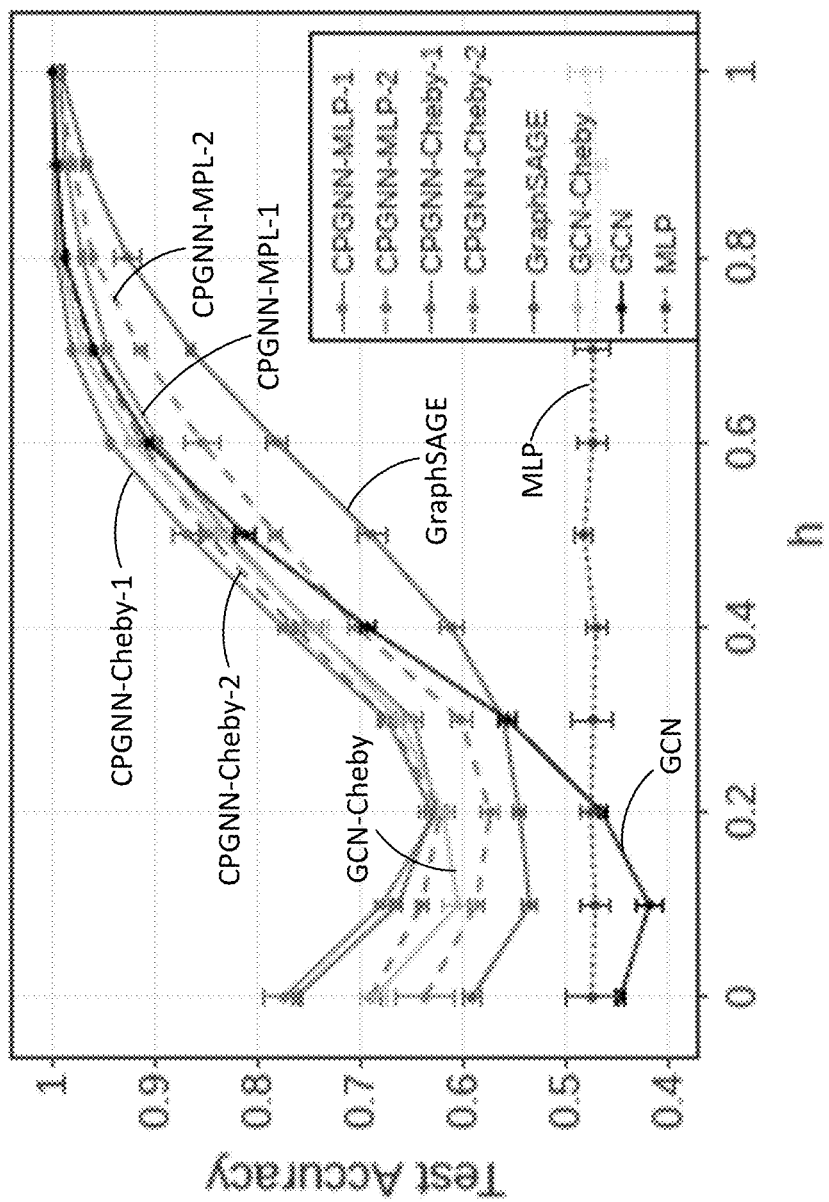
FIG. 10 depicts an example graph describing the accuracy of a CPGNN processing various datasets in accordance with certain embodiments described in the present disclosure.

FIG. 10 depicts an example graph describing the accuracy of a CPGNN processing various datasets in accordance with certain embodiments described in the present disclosure.

A CPGNN configured to process an input graph to predict class labels of nodes of the input graph is evaluated using both synthetic and real-world input graphs. The synthetic graphs and node labels are generated following an approach that expands on a Barabasi-Albert model with configurable class compatibility settings. The feature vectors for nodes in the synthetic graphs are assigned by transferring the feature vectors from existing referential benchmarks, where nodes with the same class labels in the synthetic graph are always assigned feature vectors that correspond to the same class label in the referenced benchmark. The real-world graphs include three heterophily graphs and three homophily graphs. The heterophily graphs are represented by the identifiers Texas, Squirrel, and Chameleon, and the homophily graphs are represented by the identifiers Cora, Pubmed, and Citeseer. The evaluation of the real-world graphs includes previously determined features and class labels.

Four variations of CPGNNs are analyzed. The four variations include a CPGNN that uses a multi-layer perceptron as the prior belief estimator with one aggregation layer ("CPGNN-MLP-1"), a CPGNN that uses a multi-layer perceptron as the prior belief estimator with two aggregation layers ("CPGNN-MLP-2"), a CPGNN that uses a Chebyshev polynomial-based neural network for the prior belief estimator with one aggregation layer ("CPGNN-Cheby-1"), and a CPGNN that uses a Chebyshev polynomial-based neural network for the prior belief estimator with two aggregation layers ("CPGNN-Cheby-2"). The four variations are evaluated against baseline graph neural networks (e.g., existing graph neural networks). Examples of baseline neural networks include a graph convolutional network ("GCN"), a graph attention network ("GAT"), a GCN-Cheby, GraphSAGE, MixHop, and MLP.

A first evaluation is based on node classification for graphs with contextual features. Three synthetic graphs were generated for every heterophily level h∈{0, 0.1, 0.2, . . . , 0.9, 1}. Then, 10% of nodes were randomly selected in each class for training, 10% for validation, and 80% for testing. The average classification accuracy was reported as performance of each model on all instances with the same level of heterophily. Using synthetic graphs for evaluation enables analysis of how model performance changes as a function of the level of heterophily in the graph. For instance, the level of heterophily was adjusted in the graph going from strong heterophily to strong homophily while holding other factors constant, such as degree distribution and differences in contextual features. For the real-world graphs, ten random splits were generated for training, validation, and test sets. For each split, 10% of nodes in each class were randomly selected to form the training set, with another 10% for the validation set, and the remaining as the test set.

The CPGNN-Cheby-1 consistently outperformed baseline methods across the full spectrum of low to high homophily (or high to low heterophily). Compared to the CPGNN variants, the CPGNN-Cheby-1 performs the best in all settings with h≥0.2. For h<0.2, CPGNN-MLP-1 performs the best for graphs with strong heterophily. CPGNNs described herein have a significant performance improvement over existing methods. For example, by incorporating and learning the class compatibility matrix H in an end-to-end fashion, the CPGNN-Cheby-1 achieves a gain of up to 7% compared to GCN-Cheby in heterophily settings, while CPGNN-MLP-1 performs up to 30% better in heterophily and 50% better in homophily compared to the graph-agnostic MLP model.

FIG. 11 depicts example evaluation of the accuracy of a CPGNN on homophily and heterophily graphs with features in accordance with certain embodiments described in the present disclosure. Table 1, 1104 represents the accuracy of a CPGNN on heterophily input graphs with features. As shown in Table 1, the best performing method for each graph is one of four CPGNN variants, which demonstrates the improvement of incorporating and learning the compatibility matrix H into CPGNNs over convention graph neural networks (e.g., GraphSage, GCN-Cheby, MixHop, GCN, and GAT). Overall, the CPGNN-Cheby-1 had a higher overall performance with respect to the mean performance gain across all the graphs. The evaluation results demonstrate the effectiveness of CPGNN in heterophily settings on real-world benchmarks.

Table 2, 1108 represents the accuracy of a CPGNN on homophily input graphs with features. Each CPGNN variant performed better than or comparable to the baselines, including those which have an implicit assumption of strong homophily. The CPGNN described herein is more versatile as it performs on heterophily input graphs while maintaining the same level of performance as those graph neural networks that are optimized under a strict homophily assumption.

FIG. 12 depicts example evaluation of the accuracy of a CPGNN on homophily and heterophily graphs without features in accordance with certain embodiments described in the present disclosure. Table 3, 1204 represents the accuracy of a CPGNN on heterophily input graphs without contextual features. The node features in each benchmark were replaced with an identity matrix. Each of the four CPGNN variants performed better than the benchmark graph neural networks. From a mean performance gain perspective, the four CPGNN variants outperform baselines in the overall performance, with CPGNN-MLP-1 having the best overall performance, followed by CPGNN-Cheby-1. The performance of GCN-Cheby and MLP, upon which the prior belief estimators a CPGNN may be based, are significantly worse than other methods. Table 3 1204 demonstrates the effectiveness of incorporating the class compatibility matrix H in CPGNN models and learning it in an end-to-end fashion in improving the performance of CPGNN over the benchmark graph neural networks.

Table 4, 1208 represents the accuracy of a CPGNN on homophily input graphs without contextual features. The featureless setting for graphs with strong homophily is a fundamentally easier task compared to graphs with strong heterophily, especially for methods with implicit homophily assumptions, as these methods tend to yield highly similar prediction within the proximity of each node. Despite this, the four CPGNN variants performed comparably to the state-of-the-art methods. FIGS. 10-12 illustrate that each of the four CPGNN have improved performance over benchmark graph neural networks when processing heterophony input graphs (with features or without features) and have improved or maintained performance when processing homophily input graphs (with features or without features).

General Considerations

While the present subject matter has been described in detail with respect to specific embodiments thereof, it will be appreciated that those skilled in the art, upon attaining an understanding of the foregoing, may readily produce alterations to, variations of, and equivalents to such embodiments. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The invention claimed is:

1. A method that includes performing, with one or more processing devices, operations comprising:
    receiving a dataset including a graph data structure;
    processing, with a graph neural network, the dataset to generate a new graph data structure, wherein processing the graph neural network includes, at least:
        defining a set of prior belief vectors respectively corresponding to nodes of the graph data structure,
        applying a parameterized compatibility matrix to a node of the graph neural network to propagate a characteristic of a belief vector corresponding to the node to nodes within a neighborhood of the node,
        performing echo cancelation to prevent the characteristic from being subsequently propagated back to the node while executing, using the parameterized compatibility matrix to model a probability of nodes of different classes being connected, a compatibility-guided propagation from the set of prior belief vectors,
        predicting, by the graph neural network, a class label for the node of the graph data structure based on the compatibility-guided propagations and a characteristic of at least one node within the neighborhood of the node, and
        assigning the class label to the node; and
    outputting, using the class label, the new graph data structure, wherein the new graph data structure is usable by a software tool for modifying an operation of a computing environment.

2. The method of claim 1, wherein modifying the operation of a computing environment comprises one or more of:
    servicing a query to the dataset by retrieving, from the new graph data structure, entity data corresponding to the node having the class label;
    modifying a subset of data elements of the dataset based on class labels in the new graph data structure that are generated with the compatibility-guided propagation; and
    modifying, based on entity relationship represented by edges in the new graph data structure, interactive content in a manner specific to a target entity represented by the node having the class label.

3. The method of claim 1, wherein the operations further comprise training the graph neural network by, at least:
    minimizing, via modifications to one or more parameters of the graph neural network, a loss function that is based on a cross entropy loss, a co-training loss of the graph neural network, and a regulation term that centers the parameterized compatibility matrix around zero.

4. The method of claim 1, wherein the operations further include:
    pre-training the graph neural network for a predetermined quantity of iteration using a training dataset to generate a training set of belief vectors respectively corresponding to nodes of the graph neural network;
    generating the parameterized compatibility matrix; and computing values for matrix elements of the parameterized compatibility matrix using the training set of belief vectors.

5. The method of claim 1, wherein the operations further comprise generating the parameterized compatibility matrix.

6. The method of claim 5, wherein applying the parameterized compatibility matrix includes:
iteratively applying the parameterized compatibility matrix in a sliding window to the nodes of the graph neural network.

7. A method that includes performing, with one or more processing devices, operations comprising:
accessing a dataset, wherein a portion of data of the dataset is labeled with ground truth segments;
receiving a graph neural network including a graph data structure, wherein nodes of the graph data structure model the dataset;
generating, using a neural network, a belief vector for a node of the graph data structure, the belief vector including a probability of a class label of the node;
applying a compatibility matrix to the node of the graph data structure, the compatibility matrix modifying the belief vector of the node based on belief vectors of nodes in a neighborhood of the node;
computing, based on the belief vectors, a loss value, wherein the loss value is computed based (a) a co-training loss from the neural network, and (b) a regulation value that keeps rows of the compatibility matrix centered around zero;
updating parameters of the compatibility matrix based on the loss value; and
outputting the graph data structure with the compatibility matrix as updated.

8. The method of claim 7, wherein the operations further comprise:
determining a class label for the node of the graph data structure based on the belief vector of the node and a ground truth segment corresponding to another node of the graph data structure.

9. The method of claim 7, wherein the operations further include:
applying the compatibility matrix to each node of the graph neural network in a sliding window over a quantity of iterations that is based on a quantity of nodes in the graph data structure.

10. The method of claim 9, wherein applying the compatibility matrix to the node of the graph data structure includes:
performing echo cancelation that prevents the belief vector of the node from being propagated back to the node from the nodes in the neighborhood of the node.

11. The method of claim 7, wherein the co-training loss from the graph neural network measures a distance between an initial set of belief vectors to a ground-truth distribution for nodes in a training dataset.

12. A non-transitory computer-readable medium having program code stored thereon that, when executed by processing hardware, performs operations comprising:
receiving a dataset;
applying a parameterized compatibility matrix to a node of a graph neural network to propagate a characteristic of a belief vector corresponding to the node to nodes within a neighborhood of the node,
performing echo cancelation to prevent the characteristic from being subsequently propagated back to the node;
a step for generating a graph data structure that models the dataset using a graph neural network including the parameterized compatibility matrix, the graph neural network modeling, using compatibility guided propagations, a probability of nodes of different classes being connected; and
outputting the graph data structure.

13. The non-transitory computer-readable medium of claim 12, wherein modifying the operation of a computing environment comprises one or more of:
servicing a query to the dataset by retrieving, from the graph data structure, entity data corresponding to a node having a class label;
modifying a subset of data elements the dataset based on class labels in the graph data structure that are generated with a compatibility-guided propagation; and
modifying, based on entity relationship represented by edges in the graph data structure, interactive content in a manner specific to a target entity represented by the node having the class label.

14. The transitory computer-readable medium of claim 12, wherein the operations further comprise:
a step for predicting a class label for a node based on a belief vector of the node.

15. The non-transitory computer-readable medium of claim 12, wherein the operations further include:
pre-training a neural network for a predetermined quantity of iteration using a training dataset to generate a set of belief vectors respectively corresponding to nodes of the graph neural network;
generating the parameterized compatibility matrix; and
estimating values of the parameterized compatibility matrix using the set of belief vectors.

16. The non-transitory computer-readable medium of claim 12, wherein the operations further include generating the parameterized compatibility matrix.

17. The non-transitory computer-readable medium of claim 16, wherein applying the parameterized compatibility matrix includes:
iteratively applying the parameterized compatibility matrix in a sliding window to the nodes of the graph neural network.

18. The non-transitory computer-readable medium of claim 12, wherein the operations further include:
modifying values of the parameterized compatibility matrix based on minimizing a loss value, wherein the loss value is computed based (a) a co-training loss from the graph neural network, and (b) a regulation value that keeps rows of the parameterized compatibility matrix centered around zero.

* * * * *